United States Patent
Chen

(10) Patent No.: US 9,589,325 B2
(45) Date of Patent: Mar. 7, 2017

(54) METHOD FOR DETERMINING DISPLAY MODE OF SCREEN, AND TERMINAL DEVICE

(71) Applicant: Huawei Device Co., Ltd., Shenzhen (CN)

(72) Inventor: Lei Chen, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 16 days.

(21) Appl. No.: 14/798,629

(22) Filed: Jul. 14, 2015

(65) Prior Publication Data
US 2015/0317768 A1     Nov. 5, 2015

Related U.S. Application Data

(63) Continuation of application No. PCT/CN2013/070935, filed on Jan. 24, 2013.

(51) Int. Cl.
*G06T 3/60* (2006.01)
*G06F 3/01* (2006.01)
(Continued)

(52) U.S. Cl.
CPC .............. *G06T 3/60* (2013.01); *G06F 1/1686* (2013.01); *G06F 3/012* (2013.01); *G06F 3/017* (2013.01);
(Continued)

(58) Field of Classification Search
CPC ....... G06F 3/04886; G06F 2203/04803; G06F 1/1649
(Continued)

(56) References Cited

U.S. PATENT DOCUMENTS 8,358,321 B1     1/2013  Weidner
9,262,999 B1 *   2/2016  Froment ................. G06F 3/017
(Continued)

FOREIGN PATENT DOCUMENTS

CN     101794193 A    8/2010
CN     101989126 A    3/2011
(Continued)

OTHER PUBLICATIONS

Partial English Translation and Abstract of Chinese Patent Application No. CN101794193, Jul. 10, 2015, 6 pages.
(Continued)

*Primary Examiner* — Kimberly A Williams
(74) *Attorney, Agent, or Firm* — Conley Rose, P.C.

(57) ABSTRACT

A method includes determining a connection line between two eyes in each piece of profile picture information by identifying profile picture information of each viewer of at least two viewers, and determining a positive direction of each connection line according to the connection line between the two eyes in each piece of profile picture information and a preset positive direction determining rule. When the positive directions of all the connection lines are the same, calculating an included angle between the positive direction of each connection line and a positive direction of a reference line, and performing averaging on all the included angles to obtain a first included angle; and determining a display mode of a screen according to the first included angle.

11 Claims, 14 Drawing Sheets

(51) Int. Cl.
*G06T 7/00* (2006.01)
*G06F 1/16* (2006.01)
*G06F 3/0481* (2013.01)

(52) U.S. Cl.
CPC .......... *G06F 3/0481* (2013.01); *G06T 7/0042* (2013.01); *G06T 2207/10004* (2013.01); *G06T 2207/30201* (2013.01)

(58) Field of Classification Search
USPC ....... 345/156, 158, 173, 619, 649, 655, 659; 715/750, 781, 788
See application file for complete search history.

(56) References Cited

U.S. PATENT DOCUMENTS

| | | | |
|---|---|---|---|
| 2006/0265442 A1 | 11/2006 | Palayur | |
| 2008/0239131 A1 | 10/2008 | Thorn | |
| 2009/0179893 A1* | 7/2009 | Nakamura | G02B 27/2214 345/419 |
| 2009/0239579 A1 | 9/2009 | Lee et al. | |
| 2009/0322690 A1* | 12/2009 | Hiltunen | G06F 1/1649 345/173 |
| 2010/0066763 A1 | 3/2010 | MacDougall et al. | |
| 2011/0001762 A1 | 1/2011 | Li et al. | |
| 2011/0032220 A1 | 2/2011 | Shih et al. | |
| 2011/0211256 A1 | 9/2011 | Connor | |
| 2011/0298829 A1* | 12/2011 | Stafford | G06K 9/3208 345/659 |
| 2011/0310003 A1* | 12/2011 | de la Barr | H04N 13/0402 345/156 |
| 2012/0001943 A1* | 1/2012 | Ishidera | G06F 3/0346 345/659 |
| 2012/0140050 A1* | 6/2012 | Bak | H04N 13/0434 348/56 |
| 2012/0235989 A1 | 9/2012 | Cho et al. | |
| 2012/0327106 A1* | 12/2012 | Won | G06F 3/04883 345/619 |
| 2013/0113685 A1* | 5/2013 | Sugiyama | G02B 27/0093 345/32 |
| 2013/0125045 A1* | 5/2013 | Sun | G06F 3/04883 715/788 |
| 2013/0182139 A1* | 7/2013 | Brunner | G06K 9/3208 348/222.1 |
| 2013/0290867 A1* | 10/2013 | Massand | G06F 3/04842 715/750 |
| 2013/0300671 A1* | 11/2013 | Hallerstrom Sjostedt | G06F 1/1626 345/173 |
| 2013/0328935 A1* | 12/2013 | Tu | G06F 1/1694 345/651 |
| 2014/0092139 A1* | 4/2014 | Sullivan | G09G 5/00 345/649 |
| 2014/0118256 A1* | 5/2014 | Sonoda | G06F 3/0346 345/158 |
| 2014/0184628 A1* | 7/2014 | Lee | G06F 3/1423 345/545 |
| 2015/0074589 A1* | 3/2015 | Pan | G06F 3/04886 715/781 |
| 2015/0116365 A1* | 4/2015 | Ding | G06F 3/0487 345/659 |

FOREIGN PATENT DOCUMENTS

| | | |
|---|---|---|
| CN | 102436304 A | 5/2012 |
| CN | 102685522 A | 9/2012 |
| CN | 102760024 A | 10/2012 |
| WO | 2010030985 A1 | 3/2010 |

OTHER PUBLICATIONS

Partial English Translation and Abstract of Chinese Patent Application No. CN102436304, Jul. 10, 2015, 5 pages.
Foreign Communication From a Counterpart Application, PCT Application No. PCT/CN2013/070935, English Translation of Search Report dated Oct. 17, 2013, 2 pages.
Foreign Communication From a Counterpart Application, PCT Application No. PCT/CN2013/070935, English Translation of Written Opinion dated Oct. 17, 2013, 27 pages.
Foregn Communication From a Counterpart Application, European Application No. 13873069.2, Extended European Search Report dated Jul. 1, 2016, 14 pages.
Foreign Communication From a Counterpart Application, Chinese Application No. 201380000397.8, Chinese Office Action dated Dec. 31, 2015, 8 pages.
Foreign Communication From a Counterpart Application, European Application No. 13873069.2, Extended European Search Report dated Feb. 19, 2016, 8 pages.

* cited by examiner

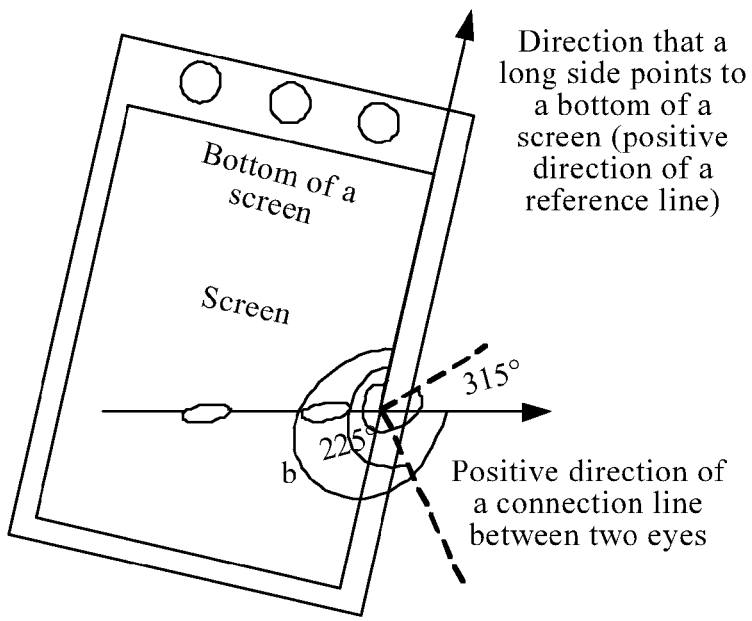

FIG. 17

```
Determine a connection line between two eyes in each
piece of profile picture information by identifying
profile picture information of each viewer of two          201
viewers, and determine a positive direction of each
connection line according to the connection line between
the two eyes in each piece of profile picture information
and a preset positive direction determining rule
```

```
Display mutually independent images to the two viewers   202
if the positive directions of the two connection lines are
opposite
```

FIG. 18

METHOD FOR DETERMINING DISPLAY MODE OF SCREEN, AND TERMINAL DEVICE

CROSS-REFERENCE TO RELATED APPLICATIONS

This application is a continuation of International Application No. PCT/CN2013/070935, filed on Jan. 24, 2013, which is hereby incorporated by reference in its entirety.

TECHNICAL FIELD

The present invention relates to image technologies, and in particular, to a method for determining a display mode of a screen, and a terminal device.

BACKGROUND

At present, a smartphone basically supports a function of display in a landscape mode or in a portrait mode and a function of switching between the landscape mode and the portrait mode. A manner of implementing switching between the landscape mode and the portrait mode includes a gravity sensing chip is disposed inside a smartphone, where the gravity sensing chip is in a form of three axial directions or six axial directions; by acquiring a component of gravity on each axial direction, a current posture of the smartphone is determined, and it is determined whether the smartphone is displayed in the landscape mode or the portrait mode.

However, on different occasions, it is difficult to ensure, simply by relying on the gravity sensing chip, that the smartphone can be accurately displayed in a manner expected by a user. For example, when a user lies leftward or rightward in a bed, the smartphone that is vertically held by the user from the perspective of the user is, however, in a horizontal state for the gravity sensing chip, and therefore, a display mode of a screen is set to a landscape mode; the smartphone that is horizontally held by the user from the perspective of the user is, however, in a vertical state for the gravity sensing chip, and therefore, the display mode of the screen is set to a portrait mode. In this case, a problem of inaccurate setting of the display mode of the screen arises, which brings inconvenience to the user in using the smartphone.

SUMMARY

Embodiments of the present invention provide a method for determining a display mode of a screen, and a terminal device, which are used to improve accuracy of determining a display mode of a screen, thereby improving use convenience for a user.

According to a first aspect, a method for determining a display mode of a screen is provided, including determining a connection line between two eyes in each piece of profile picture information by identifying profile picture information of each viewer of at least two viewers, and determining a positive direction of each connection line according to the connection line between the two eyes in each piece of profile picture information and a preset positive direction determining rule; when the positive directions of all the connection lines between the two eyes are the same, calculating an included angle between the positive direction of each connection line and a positive direction of a reference line, and performing averaging on all the included angles to obtain a first included angle, where the reference line is determined according to a long side of the screen or a short side of the screen; and determining a display mode of the screen according to the first included angle.

With reference to the first aspect, in a first possible implementation manner of the first aspect, the positive direction determining rule includes determining the positive direction of the connection line based on that a position of a nose or a mouth in the profile picture information is on the right side of the connection line between the two eyes in the profile picture information; or determining the positive direction of the connection line based on that a position of a nose or a mouth in the profile picture information is on the left side of the connection line between the two eyes in the profile picture information.

With reference to the first aspect or the first possible implementation manner of the first aspect, in a second possible implementation manner of the first aspect, the calculating an included angle between the positive direction of each connection line and a positive direction of a reference line includes determining abscissae and ordinates that are respectively corresponding to positions of the two eyes in each piece of profile picture information, where a direction of a horizontal coordinate axis in which the abscissae are located refers to a direction perpendicular to the positive direction of the reference line, and a direction of a vertical coordinate axis in which the ordinates are located is the positive direction of the reference line; and performing an inverse tangent on an absolute value of a difference between the two abscissae and an absolute value of a difference between the two ordinates to obtain the included angle.

With reference to the first possible implementation manner of the first aspect or the second possible implementation manner of the first aspect, in a third possible implementation manner of the first aspect, if the positive direction determining rule is determining the positive direction of the connection line based on that the position of the nose or the mouth in the profile picture information is on the right side of the connection line between the two eyes in the profile picture information, the determining a display mode of the screen according to the first included angle includes determining that the display mode of the screen is a portrait upright display mode if the first included angle ranges from a first degree threshold to a second degree threshold; determining that the display mode of the screen is a landscape right display mode if the first included angle ranges from the second degree threshold to a third degree threshold; determining that the display mode of the screen is a portrait upside-down display mode if the first included angle ranges from the third degree threshold to a fourth degree threshold; and determining that the display mode of the screen is a landscape left display mode if the first included angle ranges from the fourth degree threshold to the first degree threshold.

With reference to the first aspect, or the first possible implementation manner of the first aspect, or the second possible implementation manner of the first aspect, or the third possible implementation manner of the first aspect, in a fourth possible implementation manner of the first aspect. The method further includes using a two-dimensional (2D) display manner or a three-dimensional (3D) display manner if the display mode of the screen is the portrait upright display mode or the portrait upside-down display mode; or using a 2D display manner if the display mode of the screen is the landscape right display mode or the landscape left display mode.

According to a second aspect, a method for determining a display mode of a screen is provided, including determining a connection line between two eyes in each piece of profile picture information by identifying profile picture information of each viewer of two viewers, and determining a positive direction of each connection line according to the connection line between the two eyes in each piece of profile picture information and a preset positive direction determining rule; and displaying mutually independent images to the two viewers if the positive directions of the two connection lines are opposite.

With reference to the second aspect, in a first possible implementation manner of the second aspect, the displaying mutually independent images to the two viewers includes displaying the mutually independent images to the two viewers in a 3D display manner or a 2D display manner.

With reference to the first possible implementation manner of the second aspect, in a second possible implementation manner of the second aspect, the method further includes receiving a first operation instruction sent by a viewer who is operating on the screen and is of the two viewers; and performing, according to the first operation instruction, processing on an image that is of the two mutually independent images and that is to be operated by the viewer who is operating on the screen.

With reference to the second possible implementation manner of the second aspect, in a third possible implementation manner of the second aspect, before the performing, according to the first operation instruction, processing on an image that is of the two mutually independent images and that is to be operated by the viewer who is operating on the screen, the method includes determining, from the two mutually independent images according to an operation direction of the viewer who is operating on the screen and is of the two viewers, the image to be operated by the viewer who is operating on the screen; or receiving a switch instruction sent, by using a switch button, by the viewer who is operating on the screen, and determining, from the two mutually independent images according to the switch instruction, the image to be operated by the viewer who is operating on the screen.

With reference to the third possible implementation manner of the second aspect, in a fourth possible implementation manner of the second aspect, before the determining, from the two mutually independent images according to an operation direction of the viewer who is operating on the screen and is of the two viewers. The image to be operated by the viewer who is operating on the screen, the method includes acquiring, by using a camera, the operation direction of the viewer who is operating on the screen and is of the two viewers; or acquiring, by means of sensing, the operation direction of the viewer who is operating on the screen and is of the two viewers, where the screen is a touchscreen that supports a floating touch function.

With reference to the first possible implementation manner of the second aspect, in a fifth possible implementation manner of the second aspect, the displaying the mutually independent images to the two viewers in a 3D display manner includes displaying two independent windows on the screen, and displaying the two mutually independent images respectively in the two independent windows in the 3D display manner; and the method for determining a mode of a screen further includes receiving second operation instructions that are respectively sent by the two viewers and that are for operating corresponding images of the two independent images, and performing operations on the corresponding images according to the second operation instructions, where the second operation instructions are sent by the viewers by using corresponding windows on the screen.

According to a third aspect, a method for determining a display mode of a screen is provided, includes identifying profile picture information of a viewer, determining a connection line between two eyes in the profile picture information, and determining a positive direction of the connection line according to the connection line between the two eyes and a preset positive direction determining rule; calculating an included angle between the positive direction of the connection line and a positive direction of a reference line, where the reference line is determined according to a long side of the screen or a short side of the screen; and determining a display mode of the screen according to the included angle.

According to a fourth aspect, a terminal device is provided, including a first determining module configured to determine a connection line between two eyes in each piece of profile picture information by identifying profile picture information of each viewer of at least two viewers, and determine a positive direction of each connection line according to the connection line between the two eyes in each piece of profile picture information and a preset positive direction determining rule. The terminal device also includes a calculating module configured to when the positive directions of all the connection lines between the two eyes are the same, calculate an included angle between the positive direction of each connection line and a positive direction of a reference line, and perform averaging on all the included angles to obtain a first included angle, where the reference line is determined according to a long side of the screen or a short side of the screen; and a second determining module configured to determine a display mode of the screen according to the first included angle.

With reference to the fourth aspect, in a first possible implementation manner of the fourth aspect, the positive direction determining rule includes determining the positive direction of the connection line based on that a position of a nose or a mouth in the profile picture information is on the right side of the connection line between the two eyes in the profile picture information; or determining the positive direction of the connection line based on that a position of a nose or a mouth in the profile picture information is on the left side of the connection line between the two eyes in the profile picture information.

With reference to the fourth aspect or the first possible implementation manner of the fourth aspect, in a second possible implementation manner of the fourth aspect, that the calculating module is configured to calculate the included angle between the positive direction of each connection line and the positive direction of the reference line includes that the calculating module is configured to determine abscissae and ordinates that are respectively corresponding to positions of the two eyes in each piece of profile picture information, and perform an inverse tangent on an absolute value of a difference between the two abscissae and an absolute value of a difference between the two ordinates to obtain the included angle, where a direction of a horizontal coordinate axis in which the abscissae are located refers to a direction perpendicular to the positive direction of the reference line, and a direction of a vertical coordinate axis in which the ordinates are located is the positive direction of the reference line.

With reference to the first possible implementation manner of the fourth aspect or the second possible implementation manner of the fourth aspect, in a third possible implementation manner of the fourth aspect, that the second determining module is configured to determine the display mode of the screen according to the first included angle includes that the second determining module is configured to when the positive direction determining rule is determining the positive direction of the connection line based on that the position of the nose or the mouth in the profile picture information is on the right side of the connection line between the two eyes in the profile picture information, determine that the display mode of the screen is a portrait upright display mode if the first included angle ranges from a first degree threshold to a second degree threshold; determine that the display mode of the screen is a landscape right display mode if the first included angle ranges from the second degree threshold to a third degree threshold; determine that the display mode of the screen is a portrait upside-down display mode if the first included angle ranges from the third degree threshold to a fourth degree threshold; and determine that the display mode of the screen is a landscape left display mode if the first included angle ranges from the fourth degree threshold to the first degree threshold.

With reference to the fourth aspect, or the first possible implementation manner of the fourth aspect, or the second possible implementation manner of the fourth aspect, or the third possible implementation manner of the fourth aspect, in a fourth possible implementation manner of the fourth aspect, the second determining module is further configured to use a 2D display manner or a 3D display manner if the display mode of the screen is the portrait upright display mode or the portrait upside-down display mode; or use a 2D display manner if the display mode of the screen is the landscape right display mode or the landscape left display mode.

According to a fifth aspect, a terminal device is provided, including a memory configured to store a program; and a processor configured to execute the program, so as to determine a connection line between two eyes in each piece of profile picture information by identifying profile picture information of each viewer of at least two viewers, and determine a positive direction of each connection line according to the connection line between the two eyes in each piece of profile picture information and a preset positive direction determining rule; when the positive directions of all the connection lines between the two eyes are the same, calculate an included angle between the positive direction of each connection line and a positive direction of a reference line, and perform averaging on all the included angles to obtain a first included angle, where the reference line is determined according to a long side of a screen or a short side of a screen; and determine a display mode of the screen according to the first included angle.

With reference to the fifth aspect, in a first possible implementation manner of the fifth aspect, the positive direction determining rule includes determining the positive direction of the connection line based on that a position of a nose or a mouth in the profile picture information is on the right side of the connection line between the two eyes in the profile picture information; or determining the positive direction of the connection line based on that a position of a nose or a mouth in the profile picture information is on the left side of the connection line between the two eyes in the profile picture information.

With reference to the fifth aspect or the first possible implementation manner of the fifth aspect, in a second possible implementation manner of the fifth aspect, that the processor is configured to calculate the included angle between the positive direction of each connection line and the positive direction of the reference line includes that the processor is configured to determine abscissae and ordinates that are respectively corresponding to positions of the two eyes in each piece of profile picture information, and perform an inverse tangent on an absolute value of a difference between the two abscissae and an absolute value of a difference between the two ordinates to obtain the included angle, where a direction of a horizontal coordinate axis in which the abscissae are located refers to a direction perpendicular to the positive direction of the reference line, and a direction of a vertical coordinate axis in which the ordinates are located is the positive direction of the reference line.

With reference to the first possible implementation manner of the fifth aspect or the second possible implementation manner of the fifth aspect, in a third possible implementation manner of the fifth aspect, that the processor is configured to determine the display mode of the screen according to the first included angle includes the processor is configured to when the positive direction determining rule is determining the positive direction of the connection line based on that the position of the nose or the mouth in the profile picture information is on the right side of the connection line between two eyes in the profile picture information, determine that the display mode of the screen is a portrait upright display mode if the first included angle ranges from a first degree threshold to a second degree threshold; determine that the display mode of the screen is a landscape right display mode if the first included angle ranges from the second degree threshold to a third degree threshold; determine that the display mode of the screen is a portrait upside-down display mode if the first included angle ranges from the third degree threshold to a fourth degree threshold; and determine that the display mode of the screen is a landscape left display mode if the first included angle ranges from the fourth degree threshold to the first degree threshold.

With reference to the fifth aspect, or the first possible implementation manner of the fifth aspect, or the second possible implementation manner of the fifth aspect, or the third possible implementation manner of the fifth aspect, in a fourth possible implementation manner of the fifth aspect, the processor is further configured to use a 2D display manner or a 3D display manner if the display mode of the screen is the portrait upright display mode or the portrait upside-down display mode; or use a 2D display manner if the display mode of the screen is the landscape right display mode or the landscape left display mode.

According to a sixth aspect, a terminal device is provided, including a first determining module configured to determine a connection line between two eyes in each piece of profile picture information by identifying profile picture information of each viewer of two viewers, and determine a positive direction of each connection line according to the connection line between the two eyes in each piece of profile picture information and a preset positive direction determining rule; and a displaying module configured to display mutually independent images to the two viewers when the positive directions of the two connection lines are opposite.

With reference to the sixth aspect, in a first possible implementation manner of the sixth aspect, the displaying module is configured to display the mutually independent images to the two viewers in a 3D display manner or a 2D display manner.

With reference to the first possible implementation manner of the sixth aspect, in a second possible implementation manner of the sixth aspect, the terminal device further includes a first receiving module configured to receive a first operation instruction sent by a viewer who is operating on the screen and is of the two viewers; and a first processing module configured to perform, according to the first operation instruction, processing on an image that is of the two mutually independent images and that is to be operated by the viewer who is operating on the screen.

With reference to the second possible implementation manner of the sixth aspect, in a third possible implementation manner of the sixth aspect, the terminal device further includes a second determining module configured to, before the first processing module performs processing on the image that is of the two mutually independent images and that is to be operated by the viewer who is operating on the screen, determine, from the two mutually independent images according to an operation direction of the viewer who is operating on the screen and is of the two viewers, the image to be operated by the viewer who is operating on the screen; and/or a third determining module configured to, before the first processing module performs processing on the image that is of the two mutually independent images and that is to be operated by the viewer who is operating on the screen, receive a switch instruction sent, by using a switch button, by the viewer who is operating on the screen, and determine, from the two mutually independent images according to the switch instruction, the image to be operated by the viewer who is operating on the screen.

With reference to the third possible implementation manner of the sixth aspect, in a fourth possible implementation manner of the sixth aspect, the terminal device further includes a fourth determining module configured to, before the second determining module determines, from the two mutually independent images according to the operation direction of the viewer who is operating on the screen and is of the two viewers, the image to be operated by the viewer who is operating on the screen, acquire, by using a camera, the operation direction of the viewer who is operating on the screen and is of the two viewers; and/or a fifth determining module configured to, before the second determining module determines, from the two mutually independent images according to the operation direction of the viewer who is operating on the screen and is of the two viewers, the image to be operated by the viewer who is operating on the screen, acquire, by means of sensing, the operation direction of the viewer who is operating on the screen and is of the two viewers, where the screen is a touchscreen that supports a floating touch function.

With reference to the first possible implementation manner of the sixth aspect, in a fifth possible implementation manner of the sixth aspect, that the displaying module is configured to display the mutually independent images to the two viewers in a 3D display manner includes that the displaying module is configured to display two independent windows on the screen, and display the two mutually independent images respectively in the two independent windows in the 3D display manner. The terminal device further includes a second receiving module configured to receive second operation instructions that are respectively sent by the two viewers and that are for operating corresponding images of the two mutually independent images, where the second operation instructions are sent by the viewers by using corresponding windows on the screen; and a second processing module configured to perform operations on the corresponding images according to the second operation instructions.

According to a seventh aspect, a terminal device is provided, including a memory configured to store a program; and a processor configured to execute the program, so as to determine a connection line between two eyes in each piece of profile picture information by identifying profile picture information of each viewer of two viewers, and determine a positive direction of each connection line according to the connection line between the two eyes in each piece of profile picture information and a preset positive direction determining rule; and a display configured to display mutually independent images to the two viewers when the positive directions of the two connection lines are opposite.

With reference to the seventh aspect, in a first possible implementation manner of the seventh aspect, the display is configured to display the mutually independent images to the two viewers in a 3D display manner or a 2D display manner.

With reference to the first possible implementation manner of the seventh aspect, in a second possible implementation manner of the seventh aspect, the terminal device further includes a communications interface configured to receive a first operation instruction sent by a viewer who is operating on the screen and is of the two viewers; and the processor is further configured to perform, according to the first operation instruction, processing on an image that is of the two mutually independent images and that is to be operated by the viewer who is operating on the screen.

With reference to the second possible implementation manner of the seventh aspect, in a third possible implementation manner of the seventh aspect, the processor is further configured to, before performing processing on the image that is of the two mutually independent images and that is to be operated by the viewer who is operating on the screen, determine, from the two mutually independent images according to an operation direction of the viewer who is operating on the screen and is of the two viewers, the image to be operated by the viewer who is operating on the screen.

With reference to the third possible implementation manner of the seventh aspect, in a fourth possible implementation manner of the seventh aspect, the communications interface is further configured to receive a switch instruction sent, by using a switch button, by the viewer who is operating on the screen; and the processor is further configured to determine, from the two mutually independent images according to the switch instruction, the image to be operated by the viewer who is operating on the screen.

With reference to the third possible implementation manner of the seventh aspect, in a fifth possible implementation manner of the seventh aspect, the processor is further configured to, before determining, from the two mutually independent images according to the operation direction of the viewer who is operating on the screen and is of the two viewers, the image to be operated by the viewer who is operating on the screen, acquire, by using a camera, the operation direction of the viewer who is operating on the screen and is of the two viewers, or acquire, by means of sensing, the operation direction of the viewer who is operating on the screen and is of the two viewers, where the screen is a touchscreen that supports a floating touch function.

With reference to the first possible implementation manner of the seventh aspect, in a sixth possible implementation manner of the seventh aspect, that the display is configured to display the mutually independent images to the two viewers in a 3D display manner includes that the display is configured to display two independent windows on the screen, and display the two mutually independent images respectively in the two independent windows in the 3D display manner. The communications interface is further configured to receive second operation instructions that are respectively sent by the two viewers and that are for operating corresponding images of the two mutually independent images, where the second operation instructions are sent by the viewers by using corresponding windows on the screen; and the processor is further configured to perform operations on the corresponding images according to the second operation instructions.

According to an eighth aspect, a terminal device is provided, including a first determining module configured to identify profile picture information of a viewer, determine a connection line between two eyes in the profile picture information, and determine a positive direction of the connection line according to the connection line between the two eyes and a preset positive direction determining rule; a calculating module configured to calculate an included angle between the positive direction of the connection line and a positive direction of a reference line, where the reference line is determined according to a long side of the screen or a short side of the screen; and a second determining module configured to determine a display mode of the screen according to the included angle.

According to a ninth aspect, a terminal device is provided, including a memory configured to store a program; and a processor configured to execute the program, so as to identify profile picture information of a viewer, determine a connection line between two eyes in the profile picture information, and determine a positive direction of the connection line according to the connection line between the two eyes and a preset positive direction determining rule; calculate an included angle between the positive direction of the connection line and a positive direction of a reference line, where the reference line is determined according to a long side of the screen or a short side of the screen; and determine a display mode of the screen according to the included angle.

According to the method for determining a display mode of a screen and the terminal device that are provided in the embodiments of the present invention, the terminal device identifies a connection line between two eyes in profile picture information of each viewer of at least two viewers by means of an image recognition technology, calculates an included angle between a positive direction of a reference line and a positive direction of the connection line between the two eyes, performs averaging on all the included angles to obtain a first included angle, and determines a display mode of a screen according to the first included angle. In this way, a problem of inaccurate setting of a display mode of a screen caused by simply relying on a gravity sensing chip can be avoided, which helps improve accuracy of determining a display mode of a screen, thereby improving use convenience for a user.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show some embodiments of the present invention, and a person of ordinary skill in the art may still derive other drawings from these accompanying drawings without creative efforts.

FIG. 15 to FIG. 17 are several other schematic diagrams of display modes supported by a terminal device according to an embodiment of the present invention;

FIG. 18 is a flowchart of a method for determining a display mode of a screen according to another embodiment of the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

Figure 1:
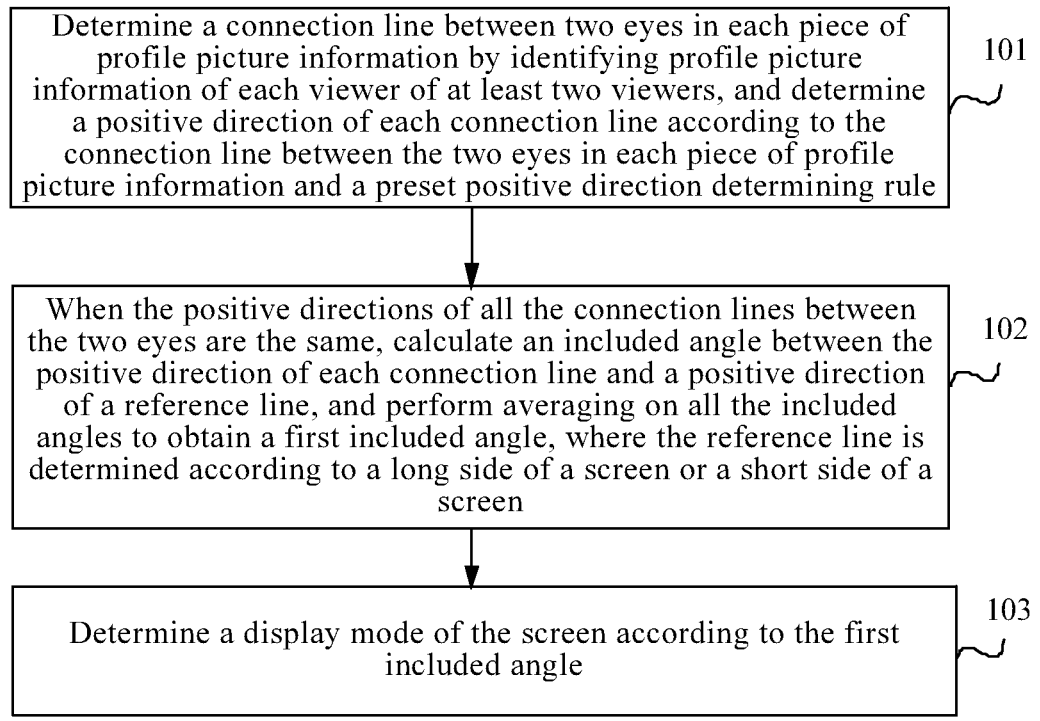
FIG. 1 is a flowchart of a method for determining a display mode of a screen according to an embodiment of the present invention.

FIG. 1 is a flowchart of a method for determining a display mode of a screen according to an embodiment of the present invention. As shown in FIG. 1, the method in this embodiment includes the following steps:

Step 101: Determine a connection line between two eyes in each piece of profile picture information by identifying profile picture information of each viewer of at least two viewers, and determine a positive direction of each connection line according to the connection line between the two eyes in each piece of profile picture information and a preset positive direction determining rule.

An execution body in this embodiment may be any terminal device that can support a function of switching between a landscape mode and a portrait mode, for example, a smartphone, a tablet computer, or a personal digital assistant (PDA).

This embodiment is not only applicable to a terminal device that supports a 2D display manner, but also applicable to a terminal device that supports a 3D display manner. For the terminal device that supports the 3D display manner, because a slit direction of a raster of the terminal device is fixed, a naked eye 3D slit raster is applicable only to a case in which the terminal device is held in a vertical direction when one person watches a screen, and a problem arises in a case in which the screen is watched in a landscape mode and in a case in which multiple persons watch the screen at the same time. Therefore, the method for determining a display mode of a screen provided in this embodiment is especially applicable to the terminal device that supports the 3D display manner.

Figure 2:
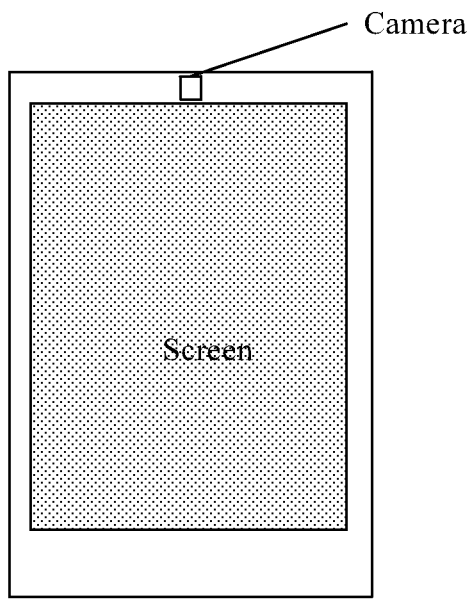
FIG. 2 is a schematic structural diagram of a front-facing camera on a terminal device according to an embodiment of the present invention.
Figure 3:
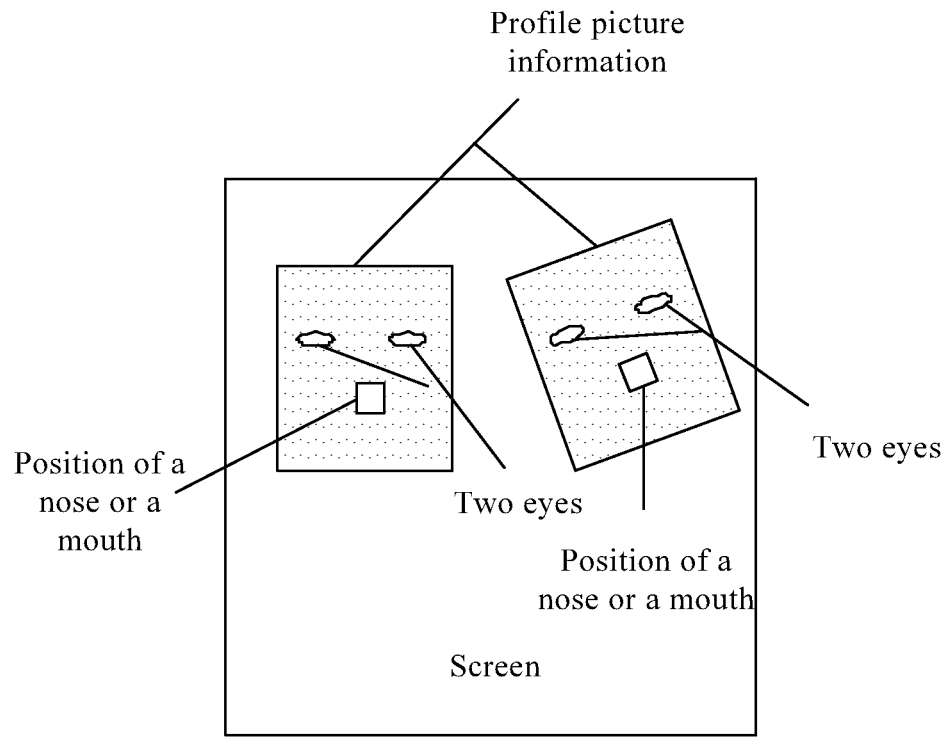
FIG. 3 is a schematic diagram of head information, collected by a camera, of two viewers, according to an embodiment of the present invention.

Because most terminal devices have a photographing function, the terminal device may collect head information of a viewer in real time by using a camera (for example, a front-facing camera) of the terminal device, so as to acquire the profile picture information of the viewer. The profile picture information of each viewer herein is essentially image information formed by a head of each viewer. As shown in FIG. 2, FIG. 2 is a schematic structural diagram of a front-facing camera on a terminal device. As shown in FIG. 3, FIG. 3 is a schematic diagram of head information, collected by a camera, of two viewers.

Because most terminal devices support an image recognition technology, after acquiring the profile picture information of each viewer, the terminal device may perform image recognition on the profile picture information of each viewer, and determine, from the profile picture information of each viewer, features that represent the viewer, for example, determine relatively distinctive features such as eyes and a mouth of the viewer, and positions of these features in the profile picture information of the viewer. Image recognition belongs to the prior art, and an implementation manner is not described in detail again. In addition, processes of performing image recognition on the profile picture information of each of the viewers are also the same.

Figure 4:
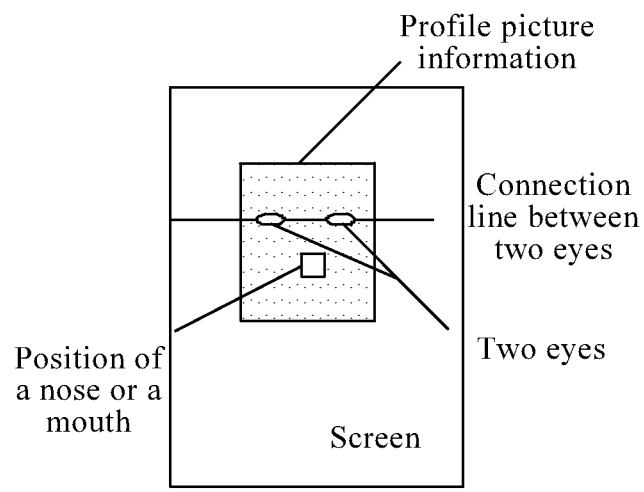
FIG. 4 is a schematic diagram of a determined connection line between two eyes according to an embodiment of the present invention.
Figure 5:
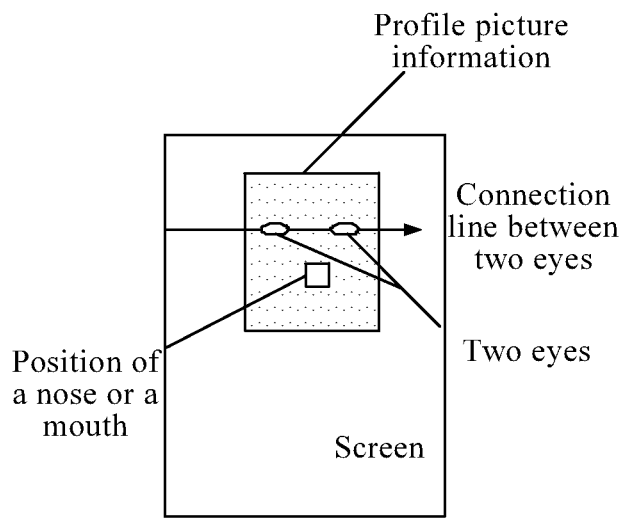
FIG. 5 is a schematic diagram of a determined positive direction of a connection line between two eyes according to an embodiment of the present invention.
Figure 6:
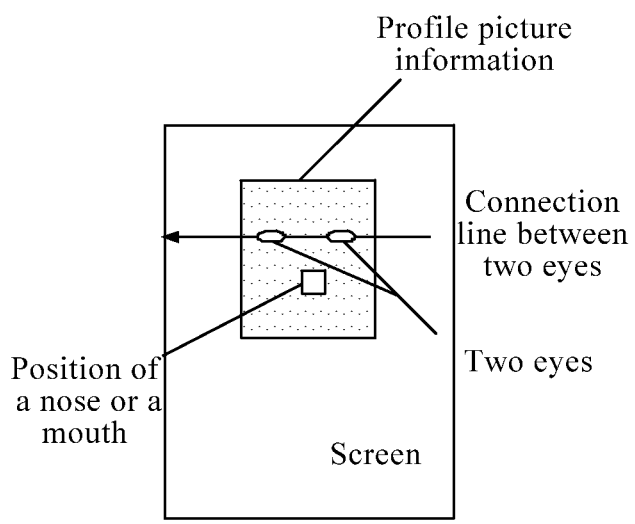
FIG. 6 is another schematic diagram of a determined positive direction of a connection line between two eyes according to an embodiment of the present invention.

No matter whether one viewer watches the screen of the terminal device or multiple viewers watch the screen of the terminal device at the same time, for each viewer, when the viewer watches the screen of the terminal device, the eyes of the viewer generally look directly at the screen of the terminal device, that is, the viewer exactly faces the screen. Therefore, the terminal device determines positions of the two eyes in each piece of profile picture information by performing image recognition on the profile picture information of each viewer, so as to obtain the connection line between the two eyes. As shown in FIG. 4, a direction that the eyes look directly at the screen is perpendicular to a direction of the connection line between the two eyes. Further, in addition to the connection line between the two eyes, a direction also needs to be determined for distinguishing whether the profile picture information is upright or upside-down, so as to help distinguish a size of an included angle appeared subsequently. In this case, a positive direction determining rule may be preset to determine the positive direction of the connection line between the two eyes, so as to help distinguish whether the profile picture information is upright or upside-down and a size of an included angle appeared subsequently. For example, the positive direction determining rule may be determining the positive direction of the connection line based on that a position of a nose or a mouth in the profile picture information is on the right side of the connection line between the two eyes in the profile picture information, that is, along the connection line between the two eyes, looking ahead from one end of the connection line based on that the position of the nose or the mouth in the profile picture information is on the right side of the connection line; then, determining that a direction of looking from one end toward the other end is the positive direction of the connection line, for example, the direction shown by the arrow on the connection line between the two eyes in FIG. 5. Based on this, the determining a positive direction of each connection line according to the connection line between the two eyes in each piece of profile picture information and a preset positive direction determining rule includes determining that a direction of the connection line oriented when the position of the nose or the mouth in each piece of profile picture information is on the right side of the connection line is the positive direction of the connection line. Alternatively, the positive direction determining rule may also be determining the positive direction of the connection line based on that a position of a nose or a mouth in the profile picture information is on the left side of the connection line between the two eyes in the profile picture information, that is, along the connection line between the two eyes, looking ahead from one end of the connection line based on that the position of the nose or the mouth in the profile picture information is on the left side of the connection line; then, determining that a direction of looking from one end toward the other end is the positive direction of the connection line, for example, the direction shown by the arrow on the connection line between the two eyes in FIG. 6. Based on this, the determining a positive direction of each connection line according to the connection line between the two eyes in each piece of profile picture information and a preset positive direction determining rule includes determining that a direction of the connection line oriented when the position of the nose or the mouth in each piece of profile picture information is on the left side of the connection line is the positive direction of the connection line. It is noted herein that, for each viewer, manners of determining the positive direction of the connection line between the two eyes in the profile picture information of the viewer are the same; therefore, profile picture information of only one viewer is used as an example for description in FIG. 5 and FIG. 6.

After the foregoing processing, the terminal device obtains the connection line between the two eyes in the profile picture information of each viewer and the positive direction of each connection line.

Step 102: When the positive directions of all the connection lines between the two eyes are the same, calculate an included angle between the positive direction of each connection line and a positive direction of a reference line, and perform averaging on all the included angles to obtain a first included angle, where the reference line is determined according to a long side of the screen or a short side of the screen.

In this embodiment, the reference line needs to be determined, so as to obtain the first included angle by calculating the included angle between the positive direction of the reference line and the positive direction of each connection line between the two eyes and performing averaging on all the included angles, and determine a display mode of the screen by using the first included angle obtained through calculation. In this embodiment, the reference line is determined based on a long side of the screen or a short side of the screen. For example, a long side of the screen or a short side of the screen may be directly used as the reference line; in addition, the reference line in this embodiment may also be a parallel line of a long side of the screen or a parallel line of a short side of the screen. A parallel line of a long side of the screen refers to a line parallel to a long side of the screen; a parallel line of a short side of the screen refers to a line parallel to a short side of the screen. Optionally, if the screen is displayed in a portrait mode, a long side of the screen or a parallel line of a long side of the screen may be selected as the reference line; if the screen is displayed in a landscape mode, a short side of the screen or a parallel line of a short side of the screen may be selected as the reference line, however, the present invention is not limited thereto.

After the reference line is determined, the positive direction of the reference line also needs to be determined. For example, a direction to which one extended line of extended lines of the reference line points may be determined as the positive direction of the reference line. For example, a top, a bottom, a left side, and a right side of the screen may be first set, and on the basis of the top, the bottom, the left side, and the right side of the screen, a direction to which one extended line of the extended lines of the reference line points is selected as the positive direction of the reference line. For example, a top, a bottom, a left side, and a right side of the screen are determined based on that the screen is displayed in the portrait mode, and that the reference line is a long side of the screen or a parallel line of a long side of the screen is used as an example; then, a direction to which an extended line points may be selected as the positive direction of the reference line, where the extended line is one of the extended lines of the reference line and points to the bottom of the screen, or a direction to which an extended line points may be selected as the positive direction of the reference line, where the extended line is one of the extended lines of the reference line and points to the top of the screen. For another example, a top, a bottom, a left side, and a right side of the screen are determined based on that the screen is displayed in the landscape mode, and that the reference line is a short side of the screen or a parallel line of a short side of the screen is used as an example; then, a direction to which an extended line points may be selected as the positive direction of the reference line, where the extended line is one of the extended lines of the reference line and points to the bottom of the screen, or a direction to which an extended line points may be selected as the positive direction of the reference line, where the extended line is one of the extended lines of the reference line and points to the top of the screen.

After determining the positive direction of the reference line and the positive direction of each connection line between the two eyes, optionally, the terminal device may first determine abscissae and ordinates that are respectively corresponding to positions of the two eyes in the profile picture information of each viewer, for example, (Xa, Ya) and (Xb, Yb). A direction of a horizontal coordinate axis in which the abscissae are located refers to a direction perpendicular to the positive direction of the reference line, and a direction of a vertical coordinate axis in which the ordinates are located is the positive direction of the reference line. For example, if a long side of the screen or a parallel line of a long side of the screen is selected as the reference line when the screen is displayed in the portrait mode, and the direction to which the extended line points is used as the positive direction of the reference line, where the extended line is one of the extended lines of the reference line and points to the bottom of the screen; then, a direction that a short side of the screen or a parallel line of a short side of the screen points to the right side of the screen is the direction of the horizontal coordinate axis, and a direction that a long side of the screen or a parallel line of a long side of the screen points to the bottom of the screen is the direction of the vertical coordinate axis. If a short side of the screen or a parallel line of a short side of the screen is selected as the reference line when the screen is displayed in the landscape mode, and the direction to which the extended line points is used as the positive direction of the reference line, where the extended line is one of the extended lines of the reference line and points to the bottom of the screen; then, a direction that a short side of the screen or a parallel line of a short side of the screen points to the bottom of the screen is the direction of the vertical coordinate axis, and a direction that a long side of the screen or a parallel line of a long side of the screen points to the right side of the screen is the direction of the horizontal coordinate axis. After the horizontal coordinate axis and the vertical coordinate axis are determined, origin coordinates of a coordinate system may be determined first, and further, coordinate values of any point in each piece of profile picture information may be determined.

Figure 7:
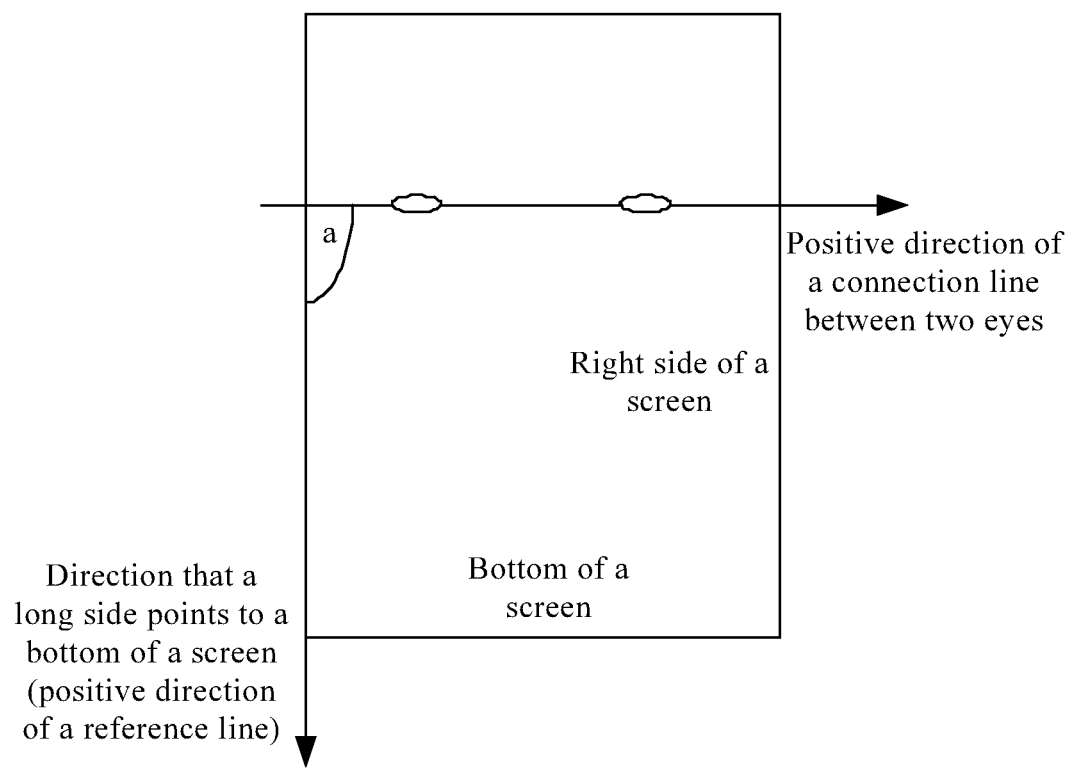
FIG. 7 to FIG. 10 are several schematic diagrams of an included angle between a reference line and a positive direction of a connection line between two eyes according to an embodiment of the present invention.
Figure 8:
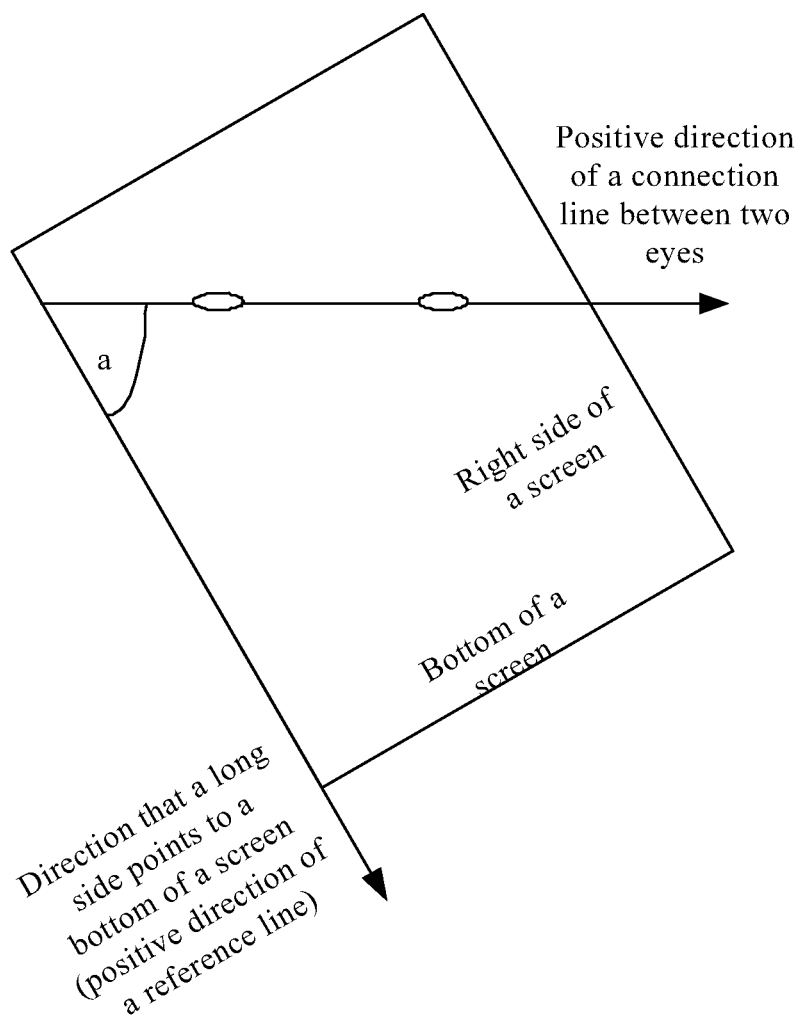
Figure 9:
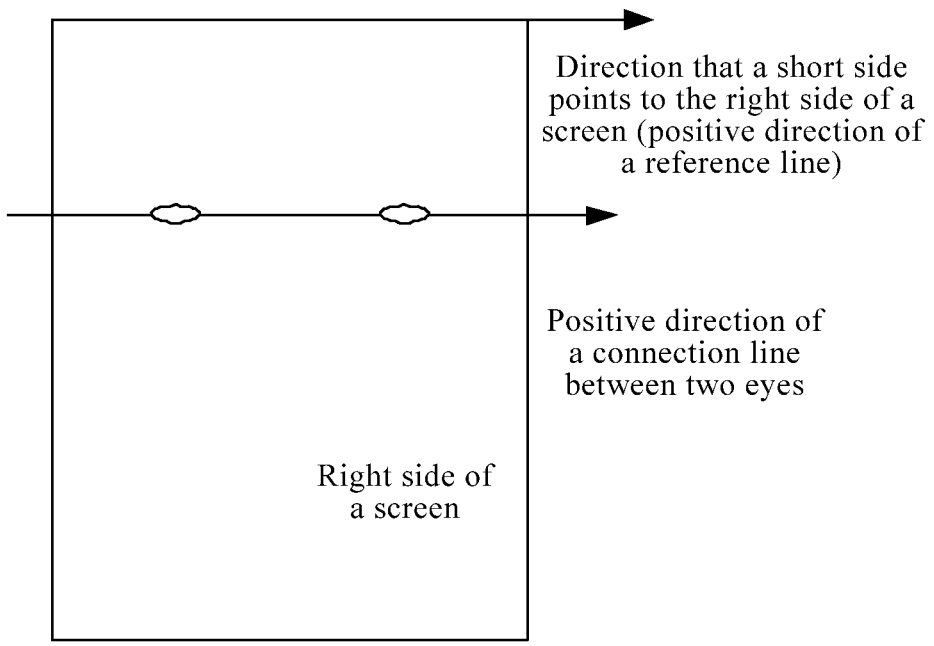
Figure 10:
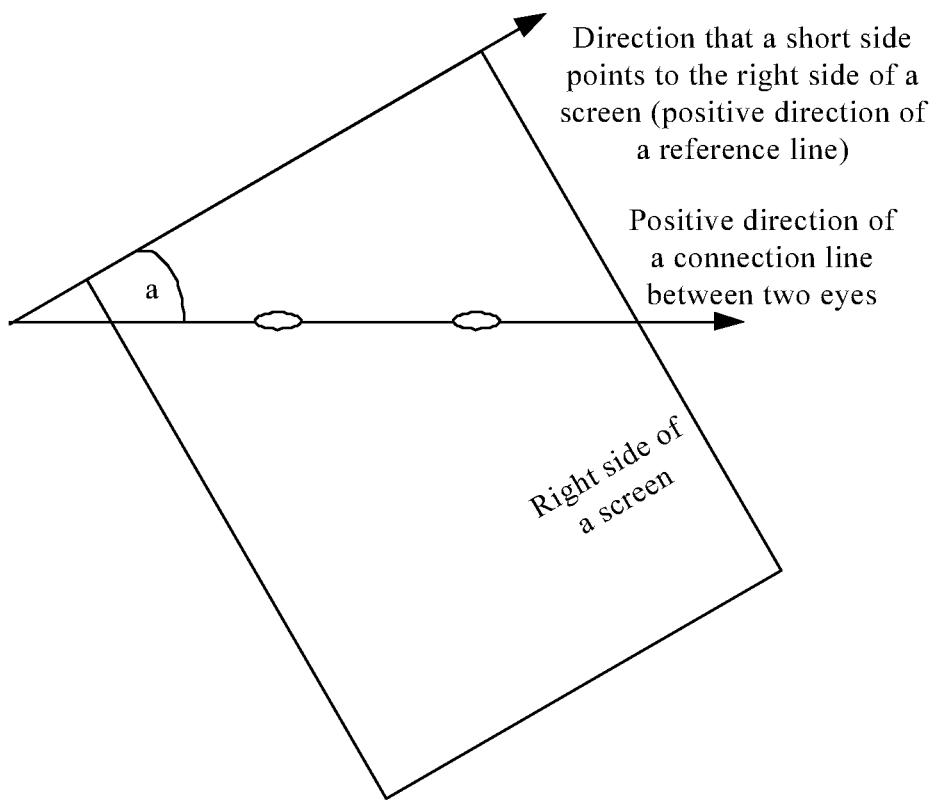

After determining the abscissae and the ordinates that are respectively corresponding to the positions of the two eyes in the profile picture information of each viewer, the terminal device further calculates an absolute value of a difference between the determined two abscissae in each piece of profile picture information and an absolute value of a difference between the determined two ordinates in each piece of profile picture information, and performs an inverse tangent on the absolute value of the difference between the two abscissae and the absolute value of the difference between the two ordinates to obtain the included angle between the positive direction of the reference line and the positive direction of the connection line between the two eyes in the profile picture information, that is, the included angle $a=\arctan\{(Xb-Xa)/(Yb-Ya)\}$. For example, it is assumed that a long side of the screen is used as the reference line, and the direction that a long side of the screen points to the bottom of the screen is the positive direction of the reference line; then, the direction of the vertical coordinate axis is the direction that a long side of the screen points to the bottom of the screen, and the direction of the horizontal coordinate axis is the direction that a short side of the screen or a parallel line of a short side of the screen points to the right side of the screen. Based on this, two cases of the included angle a between the positive direction of the reference line and the positive direction of each connection line between the two eyes are respectively shown in FIG. 7 and FIG. 8. It is assumed that a short side of the screen is used as the reference line, and the direction that a short side of the screen points to the right side of the screen is the positive direction of the reference line; then, the direction of the vertical coordinate axis is the direction that a short side of the screen points to the right side of the screen, and the direction of the horizontal coordinate axis is the direction that a long side of the screen points to the bottom of the screen. Based on this, two cases of the included angle a between the positive direction of the reference line and the positive direction of the connection line between the two eyes are respectively shown in FIG. 9 and FIG. 10. In a scenario shown in FIG. 9, the included angle a is 0, and therefore is not shown in the figure. It is noted herein that, manners of calculating the included angle between the positive direction of the reference line and the positive direction of the connection line between the two eyes in each piece of profile picture information are the same; therefore, only one piece of profile picture information is used as an example for description in FIG. 7 to FIG. 10.

After calculating the included angle between the positive direction of each connection line and the positive direction of the reference line, the terminal device performs averaging on all the included angles so that the first included angle may be obtained. In this embodiment, an angle from which each viewer watches an image displayed on the screen is not limited, for example, each viewer may look directly (that is, exactly face) at the image on the screen, or the viewer may watch an image on the screen in a slanting manner according to an actual situation, that is, the viewer does not exactly face the image on the screen. That each viewer can be ensured, as much as possible, to exactly face the image on the screen is a preferable viewing state, and the method for determining a display mode of a screen in this embodiment is proposed for achieving this objective.

Step 103: Determine a display mode of the screen according to the first included angle. After the first included angle is obtained through calculation, the display mode of the screen may be determined according to the first included angle. The display mode adjusted according to the first included angle can take into consideration a viewing situation of each viewer. The determining the display mode of the screen mainly refers to determining whether the screen is displayed in the landscape mode or in the portrait mode.

Figure 11:
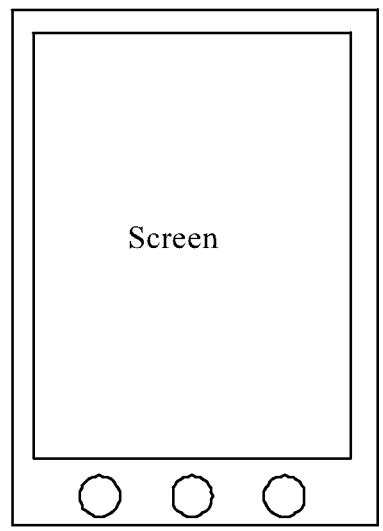
FIG. 11 to FIG. 14 are several schematic diagrams of display modes supported by a terminal device according to an embodiment of the present invention.
Figure 12:
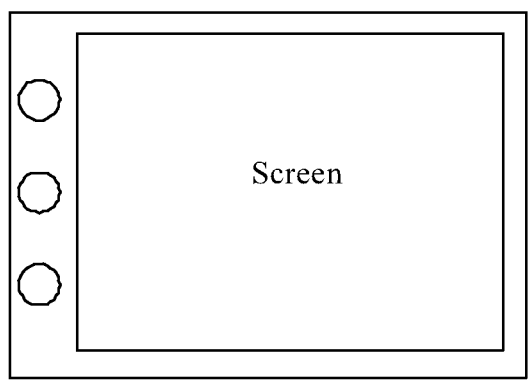
Figure 13:
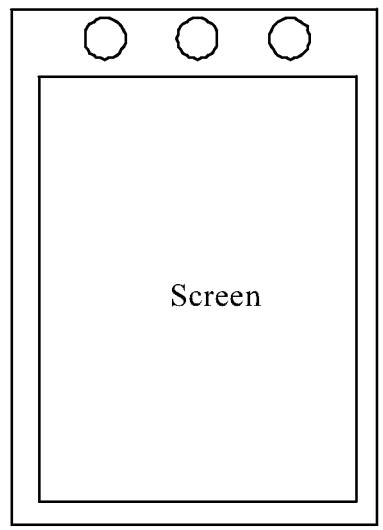
Figure 14:
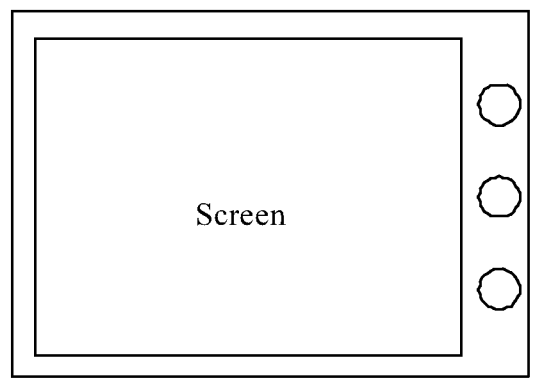

The following uses examples to describe an implementation manner of step 103. First, it is assumed that a long side of the screen is the reference line, and the direction that a long side of the screen points to the bottom of the screen is the positive direction of the reference line; then, the direction that a long side of the screen points to the bottom of the screen is the vertical coordinate axis, and the direction that a short side of the screen points to the right side of the screen is the horizontal coordinate axis. In addition, the positive direction of the connection line is determined based on that the position of the nose or the mouth in the profile picture information is on the right side of the connection line between the two eyes; then, by using an example in which the terminal device supports four display modes, that is, a portrait upright display mode, a landscape right display mode, a portrait upside-down display mode, and a landscape left display mode, a process of determining, according to a first included angle b, a display mode used by the screen is described. The portrait upright display mode is shown in FIG. 11; the landscape right display mode is shown in FIG. 12; the portrait upside-down display mode is shown in FIG. 13; the landscape left display mode is shown in FIG. 14. The circles in FIG. 11 to FIG. 14 represent operation buttons or touch buttons. The display modes shown in FIG. 11 to FIG. 14 are first distinguished according to whether the terminal device is in a portrait mode or in a landscape mode, and then are determined according to a position relationship between a liquid crystal display (LCD) screen and the operation buttons or the touch buttons on the terminal device. For example, if the terminal device is in a portrait mode and the LCD screen is above the operation buttons or the touch buttons, the display mode is the portrait upright display mode, as shown in FIG. 11; if the terminal device is in a portrait mode and the LCD screen is below the operation buttons or the touch buttons, the display mode is the portrait upside-down display mode, as shown in FIG. 13; if the terminal device is in a landscape mode and the LCD screen is on the left side of the operation buttons or the touch buttons, the display mode is the landscape left display mode, as shown in FIG. 14; if the terminal device is in a landscape mode and the LCD screen is on the right side of the operation buttons or the touch buttons, the display mode is the landscape right display mode, as shown in FIG. 12. The operation buttons may be physical buttons, or may be various functional buttons.

Based on the foregoing assumptions, the process of determining, according to a first included angle b, a display mode used by the screen includes determining that the display mode of the screen is the portrait upright display mode if the first included angle b ranges from a first degree threshold to a second degree threshold; determining that the display mode of the screen is the landscape right display mode if the first included angle b ranges from the second degree threshold to a third degree threshold; determining that the display mode of the screen is the portrait upside-down display mode if the first included angle b ranges from the third degree threshold to a fourth degree threshold; and determining that the display mode of the screen is the landscape left display mode if the first included angle b ranges from the fourth degree threshold to the first degree threshold.

Figure 15:
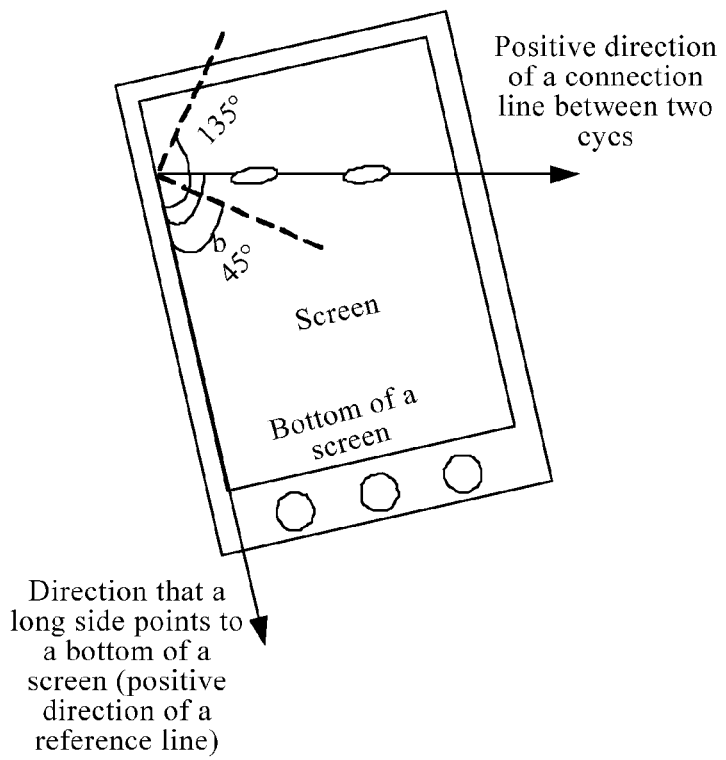
Figure 16:
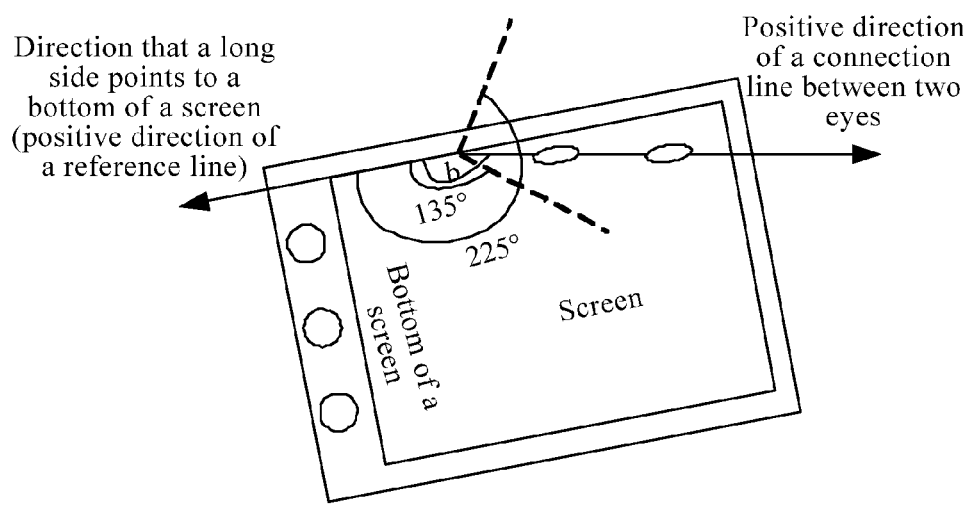

In one example, the first degree threshold is 45°, the second degree threshold is 135°, the third degree threshold is 225°, and the fourth degree threshold is 315° (that is, −45°). Then, the terminal device may set the display mode of the screen to the portrait upright display mode when the first included angle b ranges from 45° to 135°, as shown in FIG. 15; set the display mode of the screen to the landscape right display mode when the first included angle b ranges from 135° to 225°, as shown in FIG. 16; set the display mode of the screen to the portrait upside-down display mode when the first included angle b ranges from 225° to 315°, as shown in FIG. 17; and set the display mode of the screen to the landscape left display mode when the first included angle b ranges from 315° to 45°. In FIG. 15 to FIG. 17, a direction that a long side of the LCD points to the bottom of the screen is the positive direction of the reference line.

The foregoing degree thresholds are only an example for implementation; actually, the degree thresholds may be adjusted according to an actual application. In addition, according to the foregoing degree thresholds, if the first included angle b falls within a different degree threshold range, switching of the display mode occurs; in this case, when the first included angle b varies around a degree threshold, that the first included angle b belongs to different degree thresholds is caused, and frequent switching of the display mode occurs. Frequent switching of the display mode in this case is actually unnecessary; therefore, to avoid a problem of frequent switching of the display mode that occurs when the first included angle b is around a degree threshold, the foregoing degree threshold may be set to a value range instead of a specific numeric value, for example, a degree threshold may be set to be from 45° to 48°. In this way, when the first included angle b varies from 45° to 58°, switching occurs once only after the first included angle b is greater than 48°, which reduces a number of times of switching of a display mode.

In an optional implementation manner, supporting a naked eye 3D effect is a development trend of the LCD, that is, relying on manners such as a raster principle, light emitted by different pixels can be output only at a particular angle. In this way, eyes of a viewer can see different images, so as to form a 3D three-dimensional effect. At present, most terminal devices can support both 2D display mode and 3D display mode; then, in addition to performing switching of a screen display orientation (for example, a landscape mode or a portrait mode), a terminal device that supports both the 2D display mode and 3D display mode may further perform switching between 2D display manner and 3D display manner. Optionally, if the display mode of the screen is the portrait upright display mode or the portrait upside-down display mode, because polarization is performed on two directions of a left eye and a right eye in the case of the portrait display mode, the raster can distinguish images viewed respectively by the left eye and the right eye, and further, superimposition processing may be performed on the images viewed by the left eye and the right eye to form a 3D image, that is, in the portrait display mode, an angle of the raster can meet a requirement of a 3D display manner; therefore, the 2D display manner or the 3D display manner can be used. If the display mode of the screen is the landscape right display mode or the landscape left display mode, generally, polarization is performed only on a direction of the right eye or the left eye in the case of the landscape right display mode or the landscape left display mode, the raster can distinguish only an image viewed by the right eye or an image viewed by the left eye, and therefore, only a planar image can be displayed, that is, in the landscape right display mode or the landscape left display mode, an angle of the raster basically cannot meet the requirement of the 3D display manner; therefore, the 2D display manner may be used.

If the screen is originally displayed in the 2D display manner but needs to switch to the 3D display manner, the terminal device may switch the display manner of the screen from 2D to 3D. If the screen is originally displayed in the 3D display manner but needs to switch to the 2D display manner, the terminal device may switch the display manner of the screen from 3D to 2D. Naked eye 3D is a display technology that a raster technology is used to ensure that an image displayed by the LCD screen can be viewed by the outside only at a particular angle. To implement 3D display, the screen of the terminal device is required to display two different images at the same time, where the two images are directed respectively at the left eye and the right eye of a viewer, and each image can be viewed by the viewer only at a specified angle. In this way, the left eye and the right eye of the viewer respectively receives different images, and in the brain, the two images are superimposed to form a three-dimensional concept. Based on this, to switch the display mode of the screen from 3D to 2D, it is only required to change the two different image originally displayed at the same time on the screen into two images with entirely consistent content. In this way, the two images viewed by the left eye and the right eye of the viewer are actually one image, that is, an ordinary 2D display effect. Conversely, to switch the display mode of the screen from 2D to 3D, it is only required to change identical images originally displayed at the same time on the screen into two different images displayed at the same time. In this way, the images viewed by the left eye and the right eye of the viewer are different images, and in the brain, the images are superimposed to form a three-dimensional concept.

Images viewed by the left eye and the right eye of the viewer are different in the 3D display manner; therefore, for the portrait upside-down display mode, in addition to displaying the images in the 3D display manner after the images are turned upside down, switching of the images viewed by the left eye and the right eye of the viewer also needs to be considered. For example, if an image output from a side of the raster in the portrait upright display mode is an image viewed by the left eye, an image output from the same side of the raster in the portrait upside-down display mode is an image viewed by the right eye.

It can be learned from the foregoing that, in the method for determining a display mode of a screen provided in this embodiment, a terminal device identifies a connection line between two eyes in profile picture information of each viewer of at least two viewers by means of an image recognition technology, determines a positive direction of each connection line, calculates an included angle between the positive direction of each connection line and a positive direction of a reference line that is determined according to a long side or a short side of a screen, performs averaging on all the included angles to obtain a first included angle, and determines a display mode of the screen according to the first included angle. In this way, a problem of inaccurate setting of a display mode of a screen caused by simply relying on a gravity sensing chip can be avoided, which helps improve accuracy of determining a display mode of a screen, thereby improving use convenience for a user.

FIG. 18 is a flowchart of a method for determining a display mode of a screen according to another embodiment of the present invention. As shown in FIG. 18, the method in this embodiment includes the following steps:

Step 201: Determine a connection line between two eyes in each piece of profile picture information by identifying profile picture information of each viewer of two viewers, and determine a positive direction of each connection line according to the connection line between the two eyes in each piece of profile picture information and a preset positive direction determining rule.

An execution body in this embodiment may be any terminal device that can support a function of switching between a landscape mode and a portrait mode, for example, a smartphone, a tablet computer, or a PDA.

This embodiment is not only applicable to a terminal device that supports a 2D display manner, but also applicable to a terminal device that supports a 3D display manner. For the terminal device that supports the 3D display manner, because a slit direction of a raster of the terminal device is fixed, a naked eye 3D slit raster is applicable only to a case in which the terminal device is held in a vertical direction when one person watches a screen, and a problem arises in a case in which the screen is watched in a landscape mode and in a case in which multiple persons watch the screen at the same time. Therefore, the method for determining a display mode of a screen provided in this embodiment is especially applicable to the terminal device that supports the 3D display manner.

Because most terminal devices have a photographing function, the terminal device may first collect head information of each viewer in real time by using a front-facing camera of the terminal device, so as to acquire the profile picture information of each viewer. The profile picture information of each viewer herein is essentially image information formed by a head of each viewer.

As shown in FIG. 3, FIG. 3 is a schematic diagram of profile picture information, collected by a front-facing camera, of two viewers. Because most terminal devices support an image recognition technology, after acquiring the profile picture information of each viewer of the two viewer, the terminal device may separately perform image recognition on the profile picture information of each viewer, confirm that a current picture has the profile picture information of two viewers, and determine, from the profile picture information of each viewer, features that represent the viewer, for example, determine relatively distinctive features such as eyes and a mouth of the viewer, and positions of these features in the profile picture information of the viewer. Image recognition belongs to the prior art, and an implementation manner is not described in detail again. In addition, processes of performing image recognition on the profile picture information of each of the viewers are also the same.

No matter whether one viewer watches the screen of the terminal device or two viewers watch the screen of the terminal device at the same time, for each viewer, the two eyes of the viewer may look directly at the screen of the terminal device. Therefore, for each viewer, the terminal device determines positions of the two eyes in the profile picture information by performing image recognition on the profile picture information of the viewer, so as to obtain the connection line between the two eyes in the profile picture information. Further, in addition to the positions of the two eyes and the connection line between the two eyes, a direction also needs to be determined for distinguishing whether the profile picture information of the viewer is upright or upside-down. In this case, a positive direction determining rule may be preset to determine the positive direction of the connection line between the two eyes, so as to help distinguish whether the profile picture information is upright or upside-down. For example, the positive direction determining rule may be determining the positive direction of the connection line based on that a position of a nose or a mouth in the profile picture information is on the right side of the connection line between the two eyes in the profile picture information, that is, along the connection line between the two eyes, looking ahead from one end of the connection line based on that the position of the nose or the mouth in the profile picture information is on the right side of the connection line; then, determining that a direction of looking from one end to the other end is the positive direction of the connection line between the two eyes. Based on this, the determining a positive direction of each connection line according to the connection line between the two eyes in each piece of profile picture information and a preset positive direction determining rule includes determining that a direction of the connection line oriented when the position of the nose or the mouth in the profile picture information is on the right side of the connection line is the positive direction of the connection line. Alternatively, the positive direction determining rule may also be determining the positive direction of the connection line based on that a position of a nose or a mouth in the profile picture information is on the left side of the connection line between the two eyes in the profile picture information, that is, along the connection line between the two eyes, looking ahead from one end of the connection line based on that the position of the nose or the mouth in the profile picture information is on the left side of the connection line; then, determining that a direction of looking from one end to the other end is the positive direction of the connection line between the two eyes. Based on this, the determining a positive direction of each connection line according to the connection line between the two eyes in each piece of profile picture information and a preset positive direction determining rule includes determining that a direction of the connection line oriented when the position of the nose or the mouth in the profile picture information is on the left side of the connection line is the positive direction of the connection line. It is noted herein that, for each viewer, manners of determining the positive direction of the connection line between the two eyes in the profile picture information of the viewer are the same, and for exemplary diagrammatic presentation, reference may be made to FIG. 5 and FIG. 6.

After the foregoing processing, the terminal device obtains the connection line between the two eyes in the profile picture information of each viewer and the positive direction of each connection line.

Step 202: Display mutually independent images to the two viewers if the positive directions of the two connection lines are opposite. There is a special case in the 3D display manner. When there are two viewers, and the positive directions of the connection lines between the two eyes in the profile picture information of the two viewers are opposite, no matter whether the terminal device uses the 3D display manner or uses the 2D display manner, one viewer cannot view content on a display screen; therefore, the terminal device may retain an original display manner, for example, if a current display mode of the terminal device is the 3D display manner, the terminal device may continue to use the 3D display manner, and may further set the display mode of the screen to a portrait upright 3D display mode or a portrait upside-down 3D display mode. In addition, the terminal device may also switch the display manner, for example, if a current display mode of the terminal device is the 3D display manner, the display mode of the screen may be set to the 2D display manner, for example, the display mode of the screen may be set to a portrait upright 2D display mode or a portrait upside-down 2D display mode. Based on this, when the positive directions of the connection lines between the two eyes of the two viewers are opposite, the terminal device in this embodiment may display mutually independent images to the two viewers in the 3D display manner or the 2D display manner, so that both the two viewers can view an image on the screen, except that images viewed by the two viewers may be different.

There are two viewers, and a scenario in which the positive directions of the connection lines between the two eyes in the profile picture information of the two viewers are opposite is also a scenario in which the two viewers watch the screen together facing each other. The scenario in which the two viewers watch the screen together facing each other is similar to a scenario in which two persons play chess with each other, where a chessboard is equivalent to the screen in this embodiment, and a position relationship of the two chess players on both sides of the chessboard is equivalent to a position relationship of the two viewers facing each other in this embodiment. If the terminal device supports the 3D display manner, the terminal device may display images to the two viewers in the 3D display mode by using the screen. Optionally, the terminal device may display mutually independent images to the two viewers in the 3D display mode by using the screen, that is, display different images separately to the two viewers. This manner is particularly applicable to an application scenario in which two viewers need to view different content and cannot view each other's content, such as the two viewers are playing cards or military chess. However, the present invention is not limited to this display manner.

For a case in which there are two viewers, the positive directions of the connection lines between the two eyes in the profile picture information of the two viewers are opposite, and the terminal device displays mutually independent images separately to the two viewers by using the screen, a problem of distinguishing control on the screen needs to be resolved. Based on this, in an optional implementation manner, the method for determining a display mode of a screen further includes the following steps as described below.

The terminal device receives a first operation instruction sent by a viewer who is operating on the screen and is of the two viewers; the first operation instruction herein may be an operation instruction sent by one viewer of the two viewers by using the screen. The first operation instruction may be sent, for example, in a manner of touching the screen, tapping on the screen, or double tapping on the screen. The "first" herein does not represent a quantity and imposes no limitation on a sequence, and is only intended to be distinguished from another operation instruction appeared below.

The terminal device performs, according to the first operation instruction, processing on an image operated by the viewer who is operating on the screen, where the screen can independently display two images. Processing performed, according to the first operation instruction, by the terminal device on the image operated by the viewer who is operating on the screen may vary according to different images displayed. The processing may be, for example, moving part of image information in the image, or modifying part of image information in the image, or deleting part of image information in the image. For example, if the two viewers are playing Chinese chess by using the screen, a first operation instruction sent by the viewer who is operating on the screen may be an instruction of moving a piece to a specified position, and the terminal device may move, to the specified position according to the first operation instruction, the piece in the image that can be viewed by the viewer who is operating on the screen.

Optionally, before performing, according to the first operation instruction, processing on the image operated by the viewer who is operating on the screen, the terminal device needs to first determine which one of the two mutually independent images is the image operated by the viewer who is operating on the screen.

In an optional implementation manner, the terminal device determines, from the two mutually independent images according to an operation direction of the viewer who is operating on the screen and is of the two viewers, an image to be operated by the viewer who is operating on the screen. Because the two viewers face each other, if different operation instructions that are sent for operating an image are distinguished according to a direction of an action, for a same operation instruction, directions of actions of operation instructions sent by the two viewers are opposite. Therefore, the terminal device may determine, by identifying an operation direction of a viewer who is operating the screen, the viewer of the operation direction, so that it is determined which image is an image that should be operated by the viewer.

Optionally, the terminal device may photograph, by using a camera, an operating process of the viewer who is operating the screen, so as to acquire the operation direction of the viewer who is operating the screen. This implementation manner only requires that the terminal device have a camera, and there may be no special requirement for implementation of the screen.

Optionally, the terminal device may use a touchscreen that supports a floating touch function as the screen of the terminal device; then, the terminal device may acquire, by means of sensing, the operation direction of the viewer who is operating on the screen and is of the two viewers. Floating touch is implemented by simultaneously running self capacitance and mutual capacitance on a capacitive touchscreen. The mutual capacitance is used to implement normal touch sensing, including multi-touch; and the self capacitance is used to detect a finger hovering above the screen. Because the floating touch technology relies on the self capacitance, floating multi-touch cannot be implemented. That is, when a floating operation is performed, the screen does not support multi-touch. Multi-touch can be implemented only in a case in which the screen is touched in a contact manner.

When both the floating touch function and a contact touch function are implemented on the screen of the terminal device, the operation direction of the viewer who is operating on the screen can be determined by means of such implementation. An exemplary process is, after contact touch is interrupted, reading touchscreen data, and determining coordinates of a point at which contact touch occurs. When there is contact touch, considering that the viewer has an operation habit of using a finger to tap on the touchscreen, that is, there is generally an inclination angle between the finger and the touchscreen, a direction to which the finger of the viewer points may be determined by reading coordinates of self capacitance. That is, because the finger of the viewer has an inclination angle when coming into contact with the touchscreen, coordinate information of a center point acquired by the mutual capacitance is different from that acquired by the self capacitance, and the direction toward which the finger of the viewer is oriented may be determined by comparing the two pieces of information, so that a viewer that controls the screen is determined, and an image that should be controlled by the viewer is also determined.

In another optional implementation manner, the terminal device may provide switch buttons for the two viewers to perform switching, where the buttons are hardware parts disposed on the terminal device. The terminal device may receive a switch instruction sent, by using a switch button, by the viewer who is operating on the screen, and determine, according to the switch instruction, a viewer that controls the screen, and an image to be operated by the viewer who is operating on the screen is also determined. For example, a viewer that first operates on the screen may be preset; then, when the terminal device receives for the first time a switch instruction sent by a viewer by using a switch button, the terminal device may determine that the viewer that sends the switch instruction is the other viewer different from the viewer that first operates on the screen, and afterwards, each time when receiving a switch instruction, the terminal device may determine that a viewer that currently operates on the screen is the other viewer different from a viewer that operates, before the switch instruction is received, on the screen, so that it is determined that an image to be operated by the other viewer should be an image that can be viewed by the other viewer.

Based on the foregoing implementation manners, a manner in which the terminal device displays mutually independent images to the two viewers by using the screen includes displaying two independent windows on the screen, and displaying the two mutually independent images respectively in the two independent windows. In this manner, the screen is actual divided into two areas, where the two areas are independently displayed and independently controlled. Based on this, the method in this embodiment further includes receiving, by the terminal device, second operation instructions that are respectively sent by the two viewers and that are for operating corresponding images of the two independent images, and performing operations on the corresponding images according to the second operation instructions. In this implementation manner, an operation instruction sent by each viewer by using a respectively corresponding window is referred to as the second operation instruction, where the "second" herein does not represent a quantity and imposes no limitation on a sequence, and is only intended to be distinguished from the operation instruction (that is, the first operation instruction) appeared above. It is noted herein that, each viewer performs an operation in a window corresponding to the viewer so as to send, to the terminal device, an operation instruction for performing an image (that is, an image that can be viewed by the viewer) in the window.

It can be learned from the foregoing that, in the method for determining a display mode of a screen provided in this embodiment, the terminal device obtains a positive direction of a connection line between two eyes in each piece of profile picture information according to connection lines between the two eyes in the profile picture information of the two viewers, and displays mutually independent images to the two viewers when the positive directions of the two connection lines are opposite, so that the problem that possibly arises of a viewer not able to view an image when two viewers watch a screen at the same time is resolved.

Figure 19:
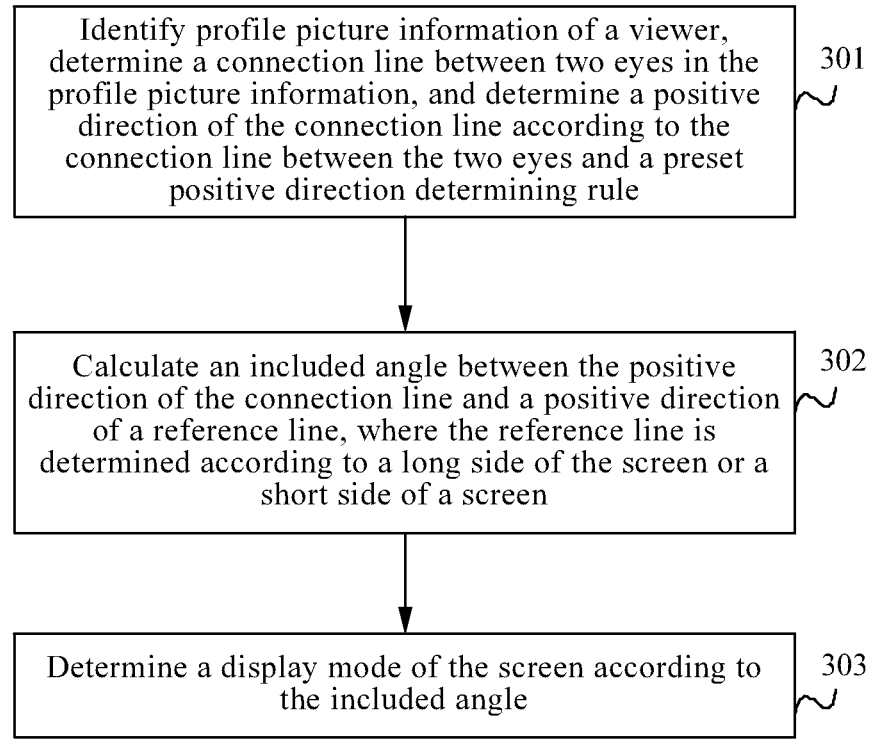
FIG. 19 is a flowchart of a method for determining a display mode of a screen according to still another embodiment of the present invention.

FIG. 19 is a flowchart of a method for determining a display mode of a screen according to another embodiment of the present invention. As shown in FIG. 19, the method in this embodiment includes the following steps:

Step 301: Identify profile picture information of a viewer, determine a connection line between two eyes in the profile picture information, and determine a positive direction of the connection line according to the connection line between the two eyes and a preset positive direction determining rule.

Step 302: Calculate an included angle between the positive direction of the connection line and a positive direction of a reference line, where the reference line is determined according to a long side of the screen or a short side of the screen.

Step 303: Determine a display mode of the screen according to the included angle.

An execution body in this embodiment may be any terminal device that can support a function of switching between a landscape mode and a portrait mode, for example, a smartphone, a tablet computer, or a PDA.

Figure 20:
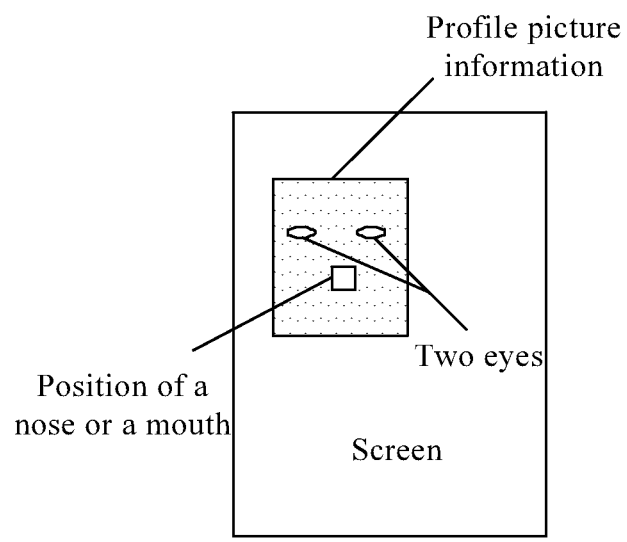
FIG. 20 is a schematic diagram of profile picture information, collected by a camera, of a viewer, according to another embodiment of the present invention.

Because most terminal devices have a photographing function, the terminal device may collect head information of a viewer in real time by using a camera (for example, a front-facing camera) of the terminal device, so as to acquire the profile picture information of the viewer. The profile picture information of each viewer herein is essentially image information formed by a head of each viewer. As shown in FIG. 2, FIG. 2 is a schematic structural diagram of a front-facing camera on a terminal device. As shown in FIG. 20, FIG. 20 is a schematic diagram of head information, collected by a camera, of a viewer.

Because most terminal devices support an image recognition technology, after acquiring the profile picture information of the viewer, the terminal device may perform image recognition on the profile picture information of the viewer, and determine, from the profile picture information of the viewer, features that represent the viewer, for example, determine relatively distinctive features such as eyes and a mouth of the viewer, and positions of these features in the profile picture information of the viewer. Image recognition belongs to the prior art, and an implementation manner is not described in detail again.

When the viewer watches the screen of the terminal device, the eyes of the viewer generally look directly at the screen of the terminal device, that is, the viewer exactly faces the screen. Therefore, the terminal device determines positions of the two eyes in the profile picture information by performing image recognition on the profile picture information of the viewer, so as to obtain the connection line between the two eyes. As shown in FIG. 4, a direction that the eyes look directly at the screen is perpendicular to a direction of the connection line between the two eyes. Further, in addition to the connection line between the two eyes, a direction also needs to be determined for distinguishing whether the profile picture information is upright or upside-down, so as to help distinguish a size of an included angle appeared subsequently. In this case, a positive direction determining rule may be preset to determine the positive direction of the connection line between the two eyes, so as to help distinguish whether the profile picture information is upright or upside-down and a size of an included angle appeared subsequently. For example, the positive direction determining rule may be determining the positive direction of the connection line based on that a position of a nose or a mouth in the profile picture information is on the right side of the connection line between the two eyes in the profile picture information, that is, along the connection line between the two eyes, looking ahead from one end of the connection line based on that the position of the nose or the mouth in the profile picture information is on the right side of the connection line; then, determining that a direction of looking from one end toward the other end is the positive direction of the connection line, for example, the direction shown by the arrow on the connection line between the two eyes in FIG. 5. Based on this, the determining a positive direction of each connection line according to the connection line between the two eyes in each piece of profile picture information and a preset positive direction determining rule includes determining that a direction of the connection line oriented when the position of the nose or the mouth in each piece of profile picture information is on the right side of the connection line is the positive direction of the connection line. Alternatively, the positive direction determining rule may also be determining the positive direction of the connection line based on that a position of a nose or a mouth in the profile picture information is on the left side of the connection line between the two eyes in the profile picture information, that is, along the connection line between the two eyes, looking ahead from one end of the connection line based on that the position of the nose or the mouth in the profile picture information is on the left side of the connection line; then, determining that a direction of looking from one end toward the other end is the positive direction of the connection line, for example, the direction shown by the arrow on the connection line between the two eyes in FIG. 6. Based on this, the determining a positive direction of each connection line according to the connection line between the two eyes in each piece of profile picture information and a preset positive direction determining rule includes determining that a direction of the connection line oriented when the position of the nose or the mouth in each piece of profile picture information is on the left side of the connection line is the positive direction of the connection line.

Further, in this embodiment, a reference line also needs to be determined, so as to calculate the included angle between the positive direction of the reference line and the positive direction of the connection line between the two eyes, and determine a display mode of the screen by using the included angle obtained through calculation. In this embodiment, the reference line is determined based on a long side or a short side of the screen. For example, a long side of the screen or a short side of the screen may be directly used as the reference line; in addition, the reference line in this embodiment may also be a parallel line of a long side of the screen or a parallel line of a short side of the screen. A parallel line of a long side of the screen refers to a line parallel to a long side of the screen; a parallel line of a short side of the screen refers to a line parallel to a short side of the screen. Optionally, if the screen is displayed in a portrait mode, a long side of the screen or a parallel line of a long side of the screen may be selected as the reference line; if the screen is displayed in a landscape mode, a short side of the screen or a parallel line of a short side of the screen may be selected as the reference line, which, however, is not limited thereto.

After the reference line is determined, the positive direction of the reference line also needs to be determined. For example, a direction to which one extended line of extended lines of the reference line points may be determined as the positive direction of the reference line. For example, a top, a bottom, a left side, and a right side of the screen may be first set, and on the basis of the top, the bottom, the left side, and the right side of the screen, a direction to which one extended line of the extended lines of the reference line points is selected as the positive direction of the reference line. For example, a top, a bottom, a left side, and a right side of the screen are determined based on that the screen is displayed in the portrait mode, and that the reference line is a long side of the screen or a parallel line of a long side of the screen is used as an example; then, a direction to which an extended line points may be selected as the positive direction of the reference line, where the extended line is one of the extended lines of the reference line and points to the bottom of the screen, or a direction to which an extended line points may be selected as the positive direction of the reference line, where the extended line is one of the extended lines of the reference line and points to the top of the screen. For another example, a top, a bottom, a left side, and a right side of the screen are determined based on that the screen is displayed in the landscape mode, and that the reference line is a short side of the screen or a parallel line of a short side of the screen is used as an example; then, a direction to which an extended line points may be selected as the positive direction of the reference line, where the extended line is one of the extended lines of the reference line and points to the bottom of the screen, or a direction to which an extended line points may be selected as the positive direction of the reference line, where the extended line is one of the extended lines of the reference line and points to the top of the screen.

After determining the positive direction of the reference line and the positive direction of the connection line between the two eyes, optionally, the terminal device may first determine abscissae and ordinates that are respectively corresponding to positions of the two eyes in the profile picture information of the viewer, for example, (Xa, Ya), and (Xb, Yb). A direction of a horizontal coordinate axis in which the abscissae are located refers to a direction perpendicular to the positive direction of the reference line, and a direction of a vertical coordinate axis in which the ordinates are located is the positive direction of the reference line. For example, if a long side of the screen or a parallel line of a long side of the screen is selected as the reference line when the screen is displayed in the portrait mode, and the direction to which the extended line points is used as the positive direction of the reference line, where the extended line is one of the extended lines of the reference line and points to the bottom of the screen; then, a direction that a short side of the screen or a parallel line of a short side of the screen points to the right side of the screen is the direction of the horizontal coordinate axis, and a direction that a long side of the screen or a parallel line of a long side of the screen points to the bottom of the screen is the direction of the vertical coordinate axis. If a short side of the screen or a parallel line of a short side of the screen is selected as the reference line when the screen is displayed in the landscape mode, and the direction to which the extended line points is used as the positive direction of the reference line, where the extended line is one of the extended lines of the reference line and points to the bottom of the screen; then, a direction that a short side of the screen or a parallel line of a short side of the screen points to the bottom of the screen is the direction of the vertical coordinate axis, and a direction that a long side of the screen or a parallel line of a long side of the screen points to the right side of the screen is the direction of the horizontal coordinate axis. After the horizontal coordinate axis and the vertical coordinate axis are determined, origin coordinates of a coordinate system may be determined first, and further, coordinate values of any point in the profile picture information may be determined.

After determining the abscissae and the ordinates that are respectively corresponding to the positions of the two eyes in the profile picture information of the viewer, the terminal device further calculates an absolute value of a difference between the two abscissae and an absolute value of a difference between the two ordinates, and performs an inverse tangent on the absolute value of the difference between the two abscissae and the absolute value of the difference between the two ordinates to obtain the included angle between the positive direction of the reference line and the positive direction of the connection line between the two eyes in the profile picture information, that is, the included angle $a=\arctan\{(Xb-Xa)/(Yb-Ya)\}$. For example, it is assumed that a long side of the screen is used as the reference line, and the direction that a long side of the screen points to the bottom of the screen is the positive direction of the reference line; then, the direction of the vertical coordinate axis is the direction that a long side of the screen points to the bottom of the screen, and the direction of the horizontal coordinate axis is the direction that a short side of the screen or a parallel line of a short side of the screen points to the right side of the screen. Based on this, two cases of the included angle a between the positive direction of the reference line and the positive direction of the connection line between the two eyes are respectively shown in FIG. 7 and FIG. 8. It is assumed that a short side of the screen is used as the reference line, and the direction that a short side of the screen points to the right side of the screen is the positive direction of the reference line; then, the direction of the vertical coordinate axis is the direction that a short side of the screen points to the right side of the screen, and the direction of the horizontal coordinate axis is the direction that a long side of the screen points to the bottom of the screen. Based on this, two cases of the included angle a between the positive direction of the reference line and the positive direction of the connection line between the two eyes are respectively shown in FIG. 9 and FIG. 10. In a scenario shown in FIG. 9, the included angle a is 0, and therefore is not shown in the figure.

After the included angle a is obtained through calculation, the display mode of the screen may be determined according to the included angle a. Determining the display mode of the screen according to the included angle a is similar to determining the display mode of the screen according to the first included angle b; for an exemplary description, reference may be made to the foregoing exemplary description of step 103, and details are not described herein again.

In an optional implementation manner, in addition to performing switching between a landscape mode and a portrait mode, the screen may also be displayed in an inclined manner. When the viewer watches the screen of the terminal device, an optimal condition is that a direction that the eyes of the viewer look directly at the screen exactly faces an image displayed on the screen, and the included angle between the positive direction of the reference line and the positive direction of the connection line between the two eyes in the profile picture information of the viewer is calculated in this embodiment, and therefore, an angle of the image displayed on the screen can be adjusted according to the included angle, so that the connection line between the two eyes of the viewer is parallel to an upper side of the image. In this case, the image displayed on the screen may be inclined relative to a direction of a long side of the screen or a direction of a short side of an LCD, that is, in this embodiment, the image displayed on the screen can further be dynamically adjusted according to swings of the head of the viewer. That the eyes of the viewer exactly face the image displayed on the screen in the foregoing is an optimal implementation manner, which, however, is not limited thereto, for example, the viewer may also watch the image on the screen in a slanting manner. For a case in which the viewer watches the image on the screen in a slanting manner, the method provided in this embodiment of the present invention may also be used to determine a display mode of a screen.

Figure 21:
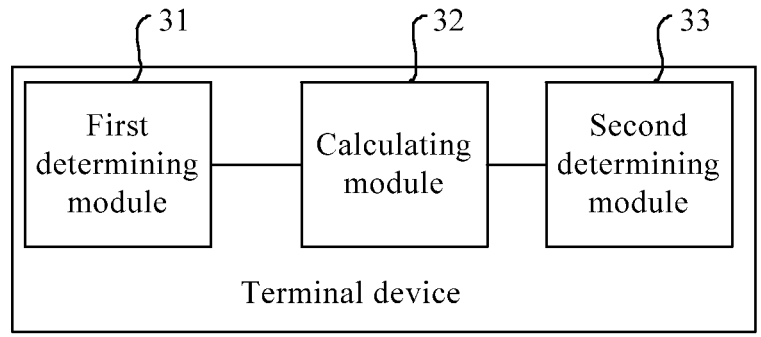
FIG. 21 is a schematic structural diagram of a terminal device according to an embodiment of the present invention.

FIG. 21 is a schematic structural diagram of a terminal device according to an embodiment of the present invention. As shown in FIG. 21, the terminal device in this embodiment includes a first determining module 31, a calculating module 32, and a second determining module 33.

The first determining module 31 is configured to determine a connection line between two eyes in each piece of profile picture information by identifying profile picture information of each viewer of at least two viewers, and determine a positive direction of each connection line according to the connection line between the two eyes in each piece of profile picture information and a preset positive direction determining rule.

The calculating module 32 is connected to the first determining module 31 and configured to, when the positive directions of all the connection lines between the two eyes are the same, calculate an included angle between the positive direction of each connection line and a positive direction of a reference line, and perform averaging on all the included angles to obtain a first included angle, where the reference line is determined according to a long side of the screen or a short side of the screen.

The second determining module 33 is connected to the calculating module 32 and configured to determine a display mode of the screen according to the first included angle.

In an optional implementation manner, the positive direction determining rule includes determining the positive direction of the connection line based on that a position of a nose or a mouth in the profile picture information is on the right side of the connection line between the two eyes in the profile picture information; then, that the first determining module 31 is configured to determine a positive direction of each connection line according to the connection line between the two eyes in each piece of profile picture information and a preset positive direction determining rule includes that the first determining module 31 is configured to determine that a direction of a connection line oriented when the position of the nose or the mouth in each piece of profile picture information is on the right side of the connection line is the positive direction of the connection line between the two eyes in the profile picture information. Alternatively, the positive direction determining rule includes determining the positive direction of the connection line based on that a position of a nose or a mouth in the profile picture information is on the left side of the connection line between the two eyes in the profile picture information; then, that the first determining module 31 is configured to determine a positive direction of each connection line according to the connection line between the two eyes in each piece of profile picture information and a preset positive direction determining rule includes that the first determining module 31 is configured to determine that a direction of the connection line oriented when the position of the nose or the mouth in each piece of profile picture information is on the left side of the connection line is the positive direction of the connection line between the two eyes in the profile picture information.

In an optional implementation manner, that the calculating module 32 is configured to calculate an included angle between the positive direction of each connection line and a positive direction of a reference line includes that the calculating module 32 is configured to determine abscissae and ordinates that are respectively corresponding to positions of the two eyes in each piece of profile picture information, and perform an inverse tangent on an absolute value of a difference between the two abscissae and an absolute value of a difference between the two ordinates to obtain the included angle, where a direction of a horizontal coordinate axis in which the abscissae are located refers to a direction perpendicular to the positive direction of the reference line, and a direction of a vertical coordinate axis in which the ordinates are located is the positive direction of the reference line.

In an optional implementation manner, that the second determining module 33 is configured to determine a display mode of the screen according to the first included angle includes that the second determining module 33 is configured to, when the positive direction determining rule is determining the positive direction of the connection line based on that the position of the nose or the mouth in the profile picture information is on the right side of the connection line between the two eyes in the profile picture information, determine that the display mode of the screen is a portrait upright display mode if the first included angle ranges from a first degree threshold to a second degree threshold; determine that the display mode of the screen is a landscape right display mode if the first included angle ranges from the second degree threshold to a third degree threshold; determine that the display mode of the screen is a portrait upside-down display mode if the first included angle ranges from the third degree threshold to a fourth degree threshold; and determine that the display mode of the screen is a landscape left display mode if the first included angle ranges from the fourth degree threshold to the first degree threshold.

In an optional implementation manner, the second determining module 33 is further configured to determine that the screen uses a 2D display manner or a 3D display manner if the display mode of the screen is the portrait upright display mode or the portrait upside-down display mode; or determine that the screen uses a 2D display manner if the display mode of the screen is the landscape right display mode or the landscape left display mode.

The terminal device in this embodiment can support a function of switching between a landscape mode and a portrait mode, for example, the terminal device may be a smartphone, a tablet computer, or a PDA.

Function modules of the terminal device that are provided in this embodiment can be configured to implement a procedure of the method for determining a display mode of a screen shown in FIG. 1. Specific operating principles of the function modules are not described again. For details, reference may be made to the descriptions in the method embodiment.

The terminal device provided in this embodiment identifies a connection line between two eyes in profile picture information of each viewer of at least two viewers by means of an image recognition technology, determines a positive direction of the connection line between the two eyes in each piece of profile picture information according to a preset positive direction determining rule, further, calculates an included angle between the positive direction of each connection line and a positive direction of a reference line, performs averaging on all the included angles to obtain a first included angle, and determines a display mode of a screen according to the first included angle. In this way, a problem of inaccurate setting of a display mode of a screen caused by simply relying on a gravity sensing chip can be avoided, which helps improve accuracy of determining a display mode of a screen, thereby improving use convenience for a user.

Figure 22:
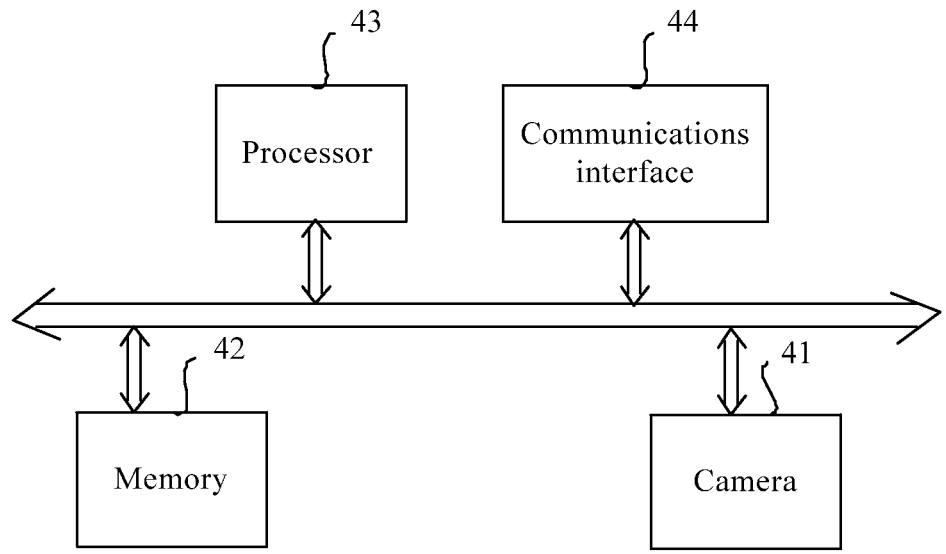
FIG. 22 is a schematic structural diagram of a terminal device according to another embodiment of the present invention.

FIG. 22 is a schematic structural diagram of a terminal device according to another embodiment of the present invention. As shown in FIG. 22, the terminal device in this embodiment includes a memory 42 and a processor 43.

The memory 42 is configured to store a program. The program may include program code, where the program code includes a computer operation instruction. In implementation, the memory 42 may include a high-speed random access memory (RAM), and may further include a non-volatile memory (non-volatile memory), for example, at least one magnetic disk memory.

The processor 43 is configured to execute the program stored by the memory 42, so as to determine a connection line between two eyes in each piece of profile picture information by identifying profile picture information of each viewer of at least two viewers, and determine a positive direction of each connection line according to the connection line between the two eyes in each piece of profile picture information and a preset positive direction determining rule; when the positive directions of all the connection lines between the two eyes are the same, calculate an included angle between the positive direction of each connection line and a positive direction of a reference line, and perform averaging on all the included angles to obtain a first included angle, where the reference line is determined according to a long side of the screen or a short side of the screen; and determine a display mode of the screen according to the first included angle.

The processor 43 may be a central processing unit (CPU), or an application-specific integrated circuit (ASIC), or one or more integrated circuits configured to implement this embodiment of the present invention.

In an optional implementation manner, the positive direction determining rule includes determining the positive direction of the connection line based on that a position of a nose or a mouth in the profile picture information is on the right side of the connection line between the two eyes in the profile picture information; then, that the processor 43 is configured to determine a positive direction of each connection line according to the connection line between the two eyes in each piece of profile picture information and a preset positive direction determining rule includes that the processor 43 is configured to determine that a direction of the connection line oriented when the position of the nose or the mouth in each piece of profile picture information is on the right side of the connection line is the positive direction of the connection line between the two eyes in the profile picture information. Alternatively, the positive direction determining rule includes determining the positive direction of the connection line based on that a position of a nose or a mouth in the profile picture information is on the left side of the connection line between the two eyes in the profile picture information; then, that the processor 43 is configured to determine a positive direction of each connection line according to the connection line between the two eyes in each piece of profile picture information and a preset positive direction determining rule includes that the processor 43 is configured to determine that a direction of the connection line oriented when the position of the nose or the mouth in each piece of profile picture information is on the left side of the connection line is the positive direction of the connection line between the two eyes in the profile picture information.

In an optional implementation manner, that the processor 43 is configured to calculate an included angle between the positive direction of each connection line and a positive direction of a reference line includes that the processor 43 is configured to determine abscissae and ordinates that are respectively corresponding to positions of the two eyes in each piece of profile picture information, and perform an inverse tangent on an absolute value of a difference between the two abscissae and an absolute value of a difference between the two ordinates to obtain the included angle, where a direction of a horizontal coordinate axis in which the abscissae are located refers to a direction perpendicular to the positive direction of the reference line, and a direction of a vertical coordinate axis in which the ordinates are located is the positive direction of the reference line.

In an optional implementation manner, that the processor 43 is configured to determine a display mode of the screen according to the first included angle includes that the processor 43 is configured to when the positive direction determining rule is determining the positive direction of the connection line based on that the position of the nose or the mouth in the profile picture information is on the right side of the connection line between the two eyes in the profile picture information, determine that the display mode of the screen is a portrait upright display mode if the first included angle ranges from a first degree threshold to a second degree threshold; determine that the display mode of the screen is a landscape right display mode if the first included angle ranges from the second degree threshold to a third degree threshold; determine that the display mode of the screen is a portrait upside-down display mode if the first included angle ranges from the third degree threshold to a fourth degree threshold; and determine that the display mode of the screen is a landscape left display mode if the first included angle ranges from the fourth degree threshold to the first degree threshold.

In an optional implementation manner, the processor 43 is further configured to determine that the screen uses a 2D display manner or a 3D display manner if the display mode of the screen is the portrait upright display mode or the portrait upside-down display mode; or determine that the screen uses a 2D display manner if the display mode of the screen is the landscape right display mode or the landscape left display mode.

Further, the terminal device in this embodiment may further include a camera 41 and a communications interface 44. The camera 41 is configured to acquire the profile picture information of each viewer; the communications interface 44 is configured to implement communication between the terminal device in this embodiment and another device.

Optionally, if the camera 41, the memory 42, the processor 43, and the communications interface 44 are implemented independently, the camera 41, the memory 42, the processor 43, and the communications interface 44 may be mutually connected and complete mutual communication through a bus. The bus may be an industry standard architecture (ISA) bus, a peripheral component interconnect (PCI) bus, an Extended Industry Standard Architecture (EISA) bus, or the like. The bus may be classified into an address bus, a data bus, a control bus, and the like. For ease of representation, the bus is represented by using only one thick line in FIG. 22; however, it does not indicate that there is only one bus or only one type of bus.

Optionally, if the camera 41, the memory 42, the processor 43, and the communications interface 44 are integrated into a chip for implementation, the camera 41, the memory 42, the processor 43, and the communications interface 44 may implement mutual communication through an internal interface.

The terminal device in this embodiment can support a function of switching between a landscape mode and a portrait mode, for example, the terminal device may be a smartphone, a tablet computer, or a PDA.

The terminal device provided in this embodiment can be configured to implement a procedure of the method for determining a display mode of a screen shown in FIG. 1. A specific operating principle of the terminal device is not described again. For details, reference may be made to the descriptions in the method embodiment.

The terminal device provided in this embodiment identifies a connection line between two eyes in profile picture information of each viewer of at least two viewers by means of an image recognition technology, determines a positive direction of the connection line between the two eyes in each piece of profile picture information according to a preset positive direction determining rule, further, calculates an included angle between the positive direction of each connection line and a positive direction of a reference line, performs averaging on all the included angles to obtain a first included angle, and determines a display mode of a screen according to the first included angle. In this way, a problem of inaccurate setting of a display mode of a screen caused by simply relying on a gravity sensing chip can be avoided, which helps improve accuracy of determining a display mode of a screen, thereby improving use convenience for a user.

Figure 23:
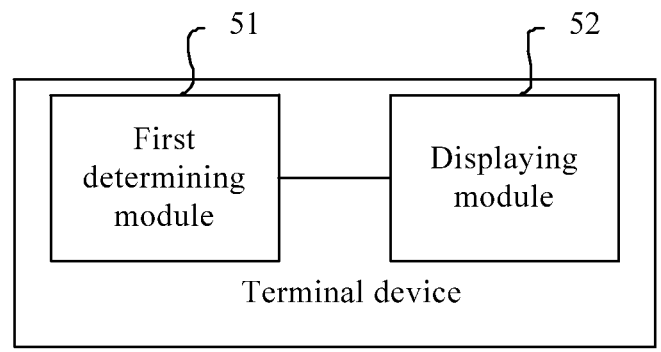
FIG. 23 is a schematic structural diagram of a terminal device according to still another embodiment of the present invention.

FIG. 23 is a schematic structural diagram of a terminal device according to still another embodiment of the present invention. As shown in FIG. 23, the terminal device in this embodiment includes a first determining module 51, and a displaying module 52.

The first determining module 51 is configured to determine a connection line between two eyes in each piece of profile picture information by identifying profile picture information of each viewer of two viewers, and determine a positive direction of each connection line according to the connection line between the two eyes in each piece of profile picture information and a preset positive direction determining rule.

The displaying module 52 is connected to the first determining module 51 and configured to display mutually independent images to the two viewers when the positive directions of the two connection lines are opposite.

In an optional implementation manner, the displaying module 52 is configured to display the mutually independent images to the two viewers in a 3D display manner or a 2D display manner.

Figure 24:
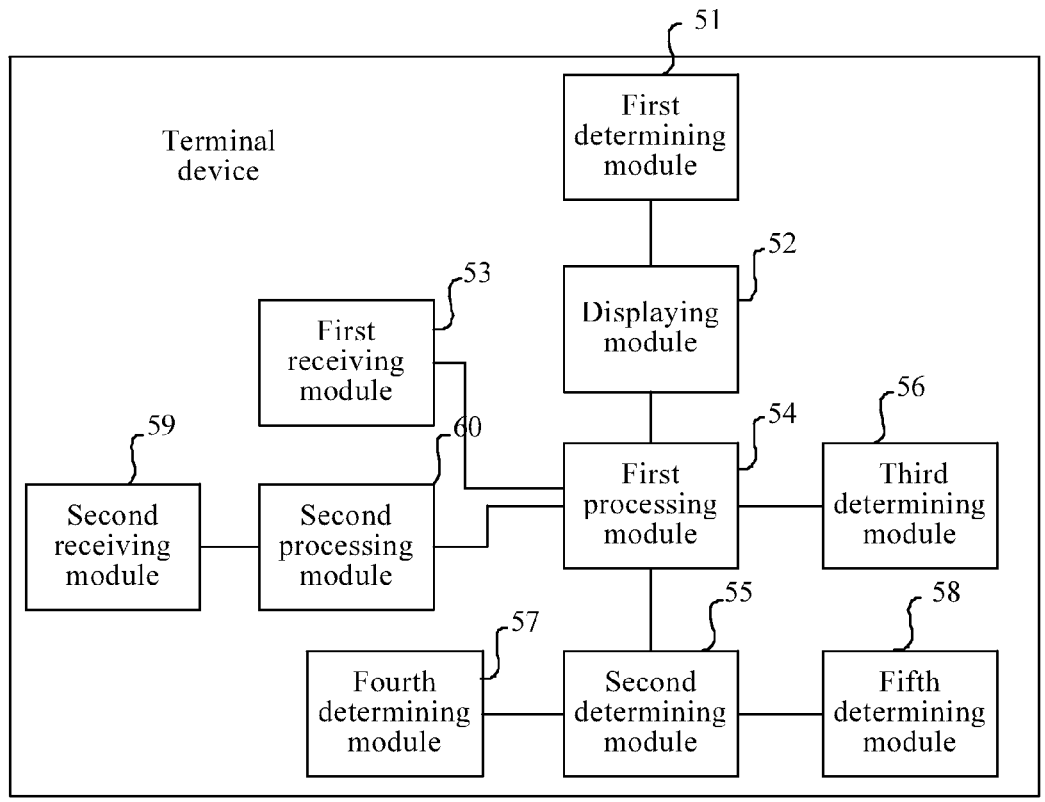
FIG. 24 is a schematic structural diagram of a terminal device according to still another embodiment of the present invention.

In an optional implementation manner, as shown in FIG. 24, the terminal device further includes a first receiving module 53 and a first processing module 54.

The first receiving module 53 is configured to receive a first operation instruction sent by a viewer who is operating on a screen and is of the two viewers. The first processing module 54 is connected to the first receiving module 53 and configured to perform, according to the first operation instruction, processing on an image to be operated by the viewer who is operating on the screen. Optionally, the first processing module 54 is further connected to the displaying module 52.

Further, as shown in FIG. 24, the terminal device in this embodiment further includes a second determining module 55, and/or a third determining module 56.

The second determining module 55 is connected to the first processing module 54 and configured to before the first processing module 54 performs processing on the image to be operated by the viewer who is operating on the screen, determine, from the two mutually independent images according to an operation direction of the viewer who is operating on the screen, the image to be operated by the viewer who is operating on the screen.

The third determining module 56 is connected to the first processing module 54 and configured to, before the first processing module 54 performs processing on the image to be operated by the viewer who is operating on the screen, receive a switch instruction sent, by using a switch button, by the viewer who is operating on the screen, and determine, from the two mutually independent images according to the switch instruction, the image to be operated by the viewer who is operating on the screen.

The second determining module 55 and the third determining module 56 are configured to provide, for the first processing module 54, indication information of the image to be operated by the viewer who is operating on the screen.

Further, as shown in FIG. 24, the terminal device in this embodiment further includes a fourth determining module 57, and/or a fifth determining module 58.

The fourth determining module 57 is connected to the second determining module 55 and configured to, before the second determining module 55 determines, from the two mutually independent images according to the operation direction of the viewer who is operating on the screen, the image to be operated by the viewer who is operating on the screen, acquire, by using a camera, the operation direction of the viewer who is operating on the screen and is of the two viewers.

The fifth determining module 58 is connected to the second determining module 55 and configured to, before the second determining module 55 determines, from the two mutually independent images according to the operation direction of the viewer who is operating on the screen and is of the two viewers, the image to be operated by the viewer who is operating on the screen, acquire, by means of sensing, the operation direction of the viewer who is operating on the screen and is of the two viewers, where the screen is a touchscreen that supports a floating touch function.

The fourth determining module 57 and the fifth determining module 58 are configured to provide, for the second determining module 55, indication information of the operation direction of the viewer who is operating on the screen and is of the two viewers.

In an optional implementation manner, that the displaying module 52 is configured to display the mutually independent images to the two viewers in a 3D display manner includes that the displaying module 52 may be configured to display two independent windows on the screen, and display the two mutually independent images respectively in the two independent windows in the 3D display manner. Based on this, the terminal device in this embodiment further includes a second receiving module 59, and a second processing module 60.

The second receiving module 59 is configured to receive second operation instructions that are respectively sent by the two viewers and that are for operating corresponding images of the two mutually independent images, where the second operation instructions are sent by the viewers by using corresponding windows on the screen.

The second processing module 60 is connected to the second receiving module 59 and configured to perform operations on the corresponding images according to the second operation instructions. Optionally, the second processing module 60 is connected to the displaying module 52.

The terminal device in this embodiment can support a function of switching between a landscape mode and a portrait mode, for example, the terminal device may be a smartphone, a tablet computer, or a PDA.

Function modules of the terminal device that are provided in this embodiment can be configured to implement a procedure of the method for determining a display mode of a screen shown in FIG. 18. Specific operating principles of the function modules are not described again. For details, reference may be made to the descriptions in the method embodiment.

The terminal device provided in this embodiment obtains a positive direction of a connection line between two eyes in each piece of profile picture information according to connection lines between the two eyes in the profile picture information of the two viewers, and displays mutually independent images to the two viewers when the positive directions of the two connection lines are opposite, so that the problem that possibly arises of a viewer not able to view an image when two viewers watch a screen at the same time is resolved.

Figure 25:
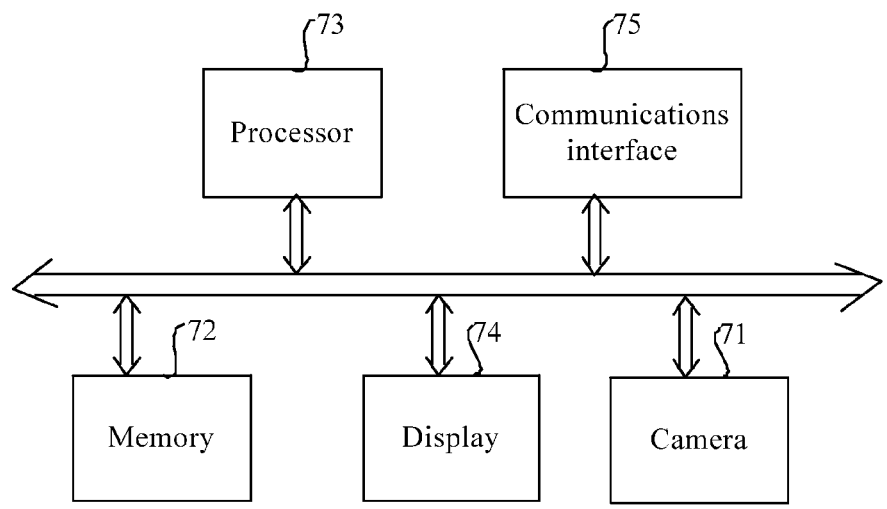
FIG. 25 is a schematic structural diagram of a terminal device according to still another embodiment of the present invention.

FIG. 25 is a schematic structural diagram of a terminal device according to still another embodiment of the present invention. As shown in FIG. 25, the terminal device in this embodiment includes a memory 72, a processor 73, and a display 74.

The memory 72 is configured to store a program. The program may include program code, where the program code includes a computer operation instruction. In implementation, the memory 72 may include a high-speed RAM memory, and may further include a non-volatile memory (non-volatile memory), for example, at least one magnetic disk memory.

The processor 73 is configured to execute the program stored by the memory 72, so as to determine a connection line between two eyes in each piece of profile picture information by identifying profile picture information of each viewer of two viewers, and determine a positive direction of each connection line according to the connection line between the two eyes in each piece of profile picture information and a preset positive direction determining rule.

The processor 73 may be a CPU, or an ASIC, or one or more integrated circuits that are configured to implement this embodiment of the present invention.

The display 74 is configured to display mutually independent images to the two viewers when the positive directions of the two connection lines are opposite.

Optionally, the display is configured to display the mutually independent images to the two viewers in a 3D display manner or a 2D display manner.

Further, the terminal device in this embodiment further includes a communications interface 75. The communications interface 75 is configured to receive a first operation instruction sent by a viewer who is operating on a screen and is of the two viewers. The processor 73 is further configured to perform, according to the first operation instruction received by the communications interface 75, processing on an image to be operated by the viewer who is operating on the screen.

In an optional implementation manner, the processor 73 is further configured to, before performing processing on the image to be operated by the viewer who is operating on the screen, determine, from the two mutually independent images according to an operation direction of the viewer who is operating on the screen and is of the two viewers, the image to be operated by the viewer who is operating on the screen.

Optionally, the terminal device in this embodiment further includes a camera 71, which is mainly configured to acquire the profile picture information of the viewer, and information such as the operation direction when the viewer is operating on the screen. The processor 73 is further configured to, before determining, from the two mutually independent images according to the operation direction of the viewer who is operating on the screen and is of the two viewers, the image to be operated by the viewer who is operating on the screen, acquire, by using the camera 71, the operation direction of the viewer who is operating on the screen and is of the two viewers. Alternatively, the processor 73 is further configured to, before determining, from the two mutually independent images according to the operation direction of the viewer who is operating on the screen and is of the two viewers, the image to be operated by the viewer who is operating on the screen, acquire, by means of sensing, the operation direction of the viewer who is operating on the screen and is of the two viewers, where the screen is a touchscreen that supports a floating touch function.

In an optional implementation manner, the communications interface 75 is further configured to receive a switch instruction sent, by using a switch button, by the viewer who is operating on the screen. The processor 73 is further configured to determine, from the two mutually independent images according to the switch instruction received by the communications interface 75, the image to be operated by the viewer who is operating on the screen.

In an optional implementation manner, that the display 74 is configured to display the mutually independent images to the two viewers in a 3D display manner includes that the display 74 may be configured to display two independent windows on the screen, and display the two mutually independent images respectively in the two independent windows in the 3D display manner. Based on this, the communications interface 75 is further configured to receive second operation instructions that are respectively sent by the two viewers and that are for operating corresponding images of the two mutually independent images. The processor 73 is further configured to perform operations on the corresponding images according to the second operation instructions, where the second operation instructions are sent by the viewers by using corresponding windows on the screen.

Optionally, if the camera 71, the memory 72, the processor 73, the display 74, and the communications interface 75 are implemented independently, the camera 71, the memory 72, the processor 73, the display 74, and the communications interface 75 may be mutually connected and complete mutual communication through a bus. The bus may be an ISA bus, a PCI bus, an EISA bus, or the like. The bus may be classified into an address bus, a data bus, a control bus, and the like. For ease of representation, the bus is represented by using only one thick line in FIG. 25; however, it does not indicate that there is only one bus or only one type of bus.

Optionally, if the camera 71, the memory 72, the processor 73, the display 74 and the communications interface 75 are integrated into a chip for implementation, the camera 71, the memory 72, the processor 73, the display 74, and the communications interface 75 may implement mutual communication through an internal interface.

The terminal device in this embodiment can support a function of switching between a landscape mode and a portrait mode, for example, the terminal device may be a smartphone, a tablet computer, or a PDA.

The terminal device provided in this embodiment can be configured to implement a procedure of the method for determining a display mode of a screen shown in FIG. 18. A specific operating principle of the terminal device is not described again. For details, reference may be made to the descriptions in the method embodiment.

The terminal device provided in this embodiment obtains a positive direction of a connection line between two eyes in each piece of profile picture information according to connection lines between the two eyes in the profile picture information of the two viewers, and displays mutually independent images to the two viewers when the positive directions of the two connection lines are opposite, so that the problem that possibly arises of a viewer not able to view an image when two viewers watch a screen at the same time is resolved.

Figure 26:
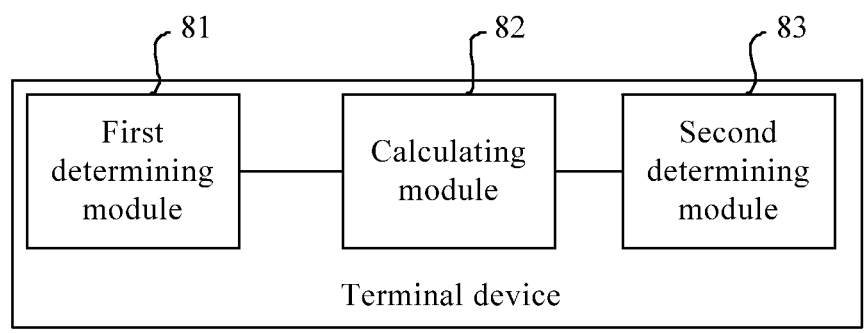
FIG. 26 is a schematic structural diagram of a terminal device according to still another embodiment of the present invention.

FIG. 26 is a schematic structural diagram of a terminal device according to still another embodiment of the present invention. As shown in FIG. 26, the terminal device in this embodiment includes a first determining module 81, a calculating module 82, and a second determining module 83.

The first determining module 81 is configured to identify profile picture information of a viewer, determine a connection line between two eyes in the profile picture information, and determine a positive direction of the connection line according to the connection line between the two eyes and a preset positive direction determining rule.

The calculating module 82 is connected to the first determining module 81 and configured to calculate an included angle between the positive direction of the connection line and a positive direction of a reference line, where the reference line is determined according to a long side of the screen or a short side of the screen.

The second determining module 83 is connected to the calculating module 82 and configured to determine a display mode of the screen according to the included angle.

The terminal device in this embodiment can support a function of switching between a landscape mode and a portrait mode, for example, the terminal device may be a smartphone, a tablet computer, or a PDA.

Function modules of the terminal device that are provided in this embodiment can be configured to implement a procedure of the method for determining a display mode of a screen shown in FIG. 19. Specific operating principles of the function modules are not described again. For details, reference may be made to the descriptions in the method embodiment.

The terminal device provided in this embodiment identifies a connection line between two eyes in profile picture information of a viewer by means of an image recognition technology, calculates an included angle between a positive direction of a reference line and a positive direction of the connection line between the two eyes, and determines a display mode of a screen according to the included angle. In this way, a problem of inaccurate setting of a display mode of a screen caused by simply relying on a gravity sensing chip can be avoided, which helps improve accuracy of determining a display mode of a screen, thereby improving use convenience for a user.

Figure 27:
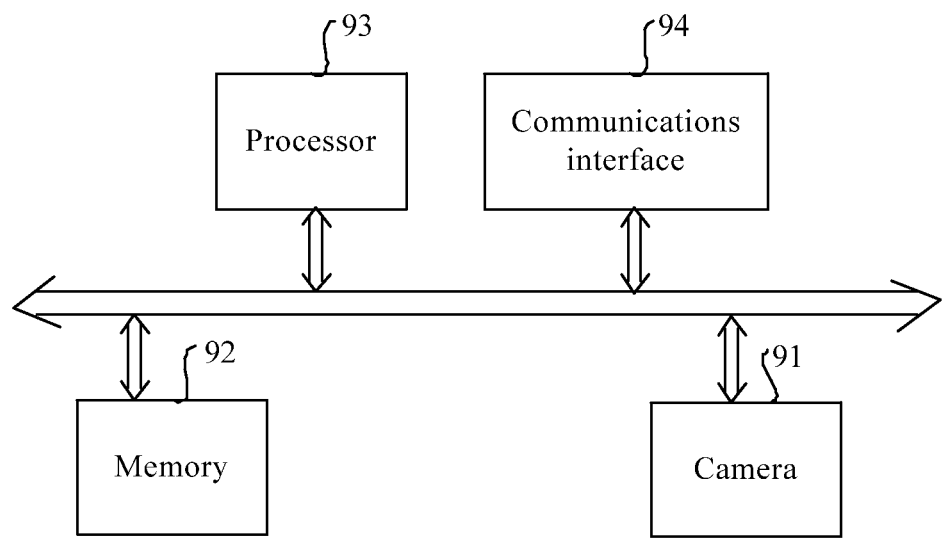
FIG. 27 is a schematic structural diagram of a terminal device according to still another embodiment of the present invention.

FIG. 27 is a schematic structural diagram of a terminal device according to still another embodiment of the present invention. As shown in FIG. 27, the terminal device in this embodiment includes a memory 92 and a processor 93.

The memory 92 is configured to store a program. The program may include program code, where the program code includes a computer operation instruction. In implementation, the memory 92 may include a high-speed RAM memory, and may further include a non-volatile memory (non-volatile memory), for example, at least one magnetic disk memory.

The processor 93 is configured to execute the program stored by the memory 92, so as to identify profile picture information of a viewer, determine a connection line between two eyes in the profile picture information, and determine a positive direction of the connection line according to the connection line between the two eyes and a preset positive direction determining rule; calculate an included angle between the positive direction of the connection line and a positive direction of a reference line, where the reference line is determined according to a long side of the screen or a short side of the screen; and determine a display mode of the screen according to the included angle.

The processor 93 may be a CPU, or an ASIC, or one or more integrated circuits that are configured to implement this embodiment of the present invention.

Further, the terminal device in this embodiment may further include a camera 91 and a communications interface 94. The camera 91 is configured to acquire the profile picture information of the viewer; the communications interface 94 is configured to implement communication between the terminal device in this embodiment and another device.

Optionally, if the camera 91, the memory 92, the processor 93, and the communications interface 94 are implemented independently, the camera 91, the memory 92, the processor 93, and the communications interface 94 may be mutually connected and complete mutual communication through a bus. The bus may be an ISA bus, a PCI bus, an EISA bus, or the like. The bus may be classified into an address bus, a data bus, a control bus, and the like. For ease of representation, the bus is represented by using only one thick line in FIG. 27; however, it does not indicate that there is only one bus or only one type of bus.

Optionally, if the camera 91, the memory 92, the processor 93, and the communications interface 94 are integrated into a chip for implementation, the camera 91, the memory 92, the processor 93, and the communications interface 94 may implement mutual communication through an internal interface.

The terminal device in this embodiment can support a function of switching between a landscape mode and a portrait mode, for example, the terminal device may be a smartphone, a tablet computer, or a PDA.

Function modules of the terminal device that are provided in this embodiment can be configured to implement a procedure of the method for determining a display mode of a screen shown in FIG. 19. Specific operating principles of the function modules are not described again. For details, reference may be made to the descriptions in the method embodiment.

The terminal device provided in this embodiment identifies a connection line between two eyes in profile picture information of a viewer by means of an image recognition technology, calculates an included angle between a positive direction of a reference line and a positive direction of the connection line between the two eyes, and determines a display mode of a screen according to the included angle. In this way, a problem of inaccurate setting of a display mode of a screen caused by simply relying on a gravity sensing chip can be avoided, which helps improve accuracy of determining a display mode of a screen, thereby improving use convenience for a user.

According to a second embodiment, a terminal device is provided. The terminal device includes a memory configured to store a program; and a processor configured to execute the program, so as to determine a connection line between two eyes in each piece of profile picture information by identifying profile picture information of each viewer of at least two viewers, and determine a positive direction of each connection line according to the connection line between the two eyes in each piece of profile picture information and a preset positive direction determining rule. When the positive directions of all the connection lines between the two eyes are the same, calculate an included angle between the positive direction of each connection line and a positive direction of a reference line, and perform averaging on all the included angles to obtain a first included angle, wherein the reference line is determined according to a long side of a screen or a short side of a screen; and determine a display mode of the screen according to the first included angle.

With reference to the second embodiment, in a first possible implementation manner of the second embodiment wherein the positive direction determining rule comprises determining the positive direction of the connection line based on that a position of a nose or a mouth in the profile picture information is on the right side of the connection line between the two eyes in the profile picture information; or determining the positive direction of the connection line based on that a position of a nose or a mouth in the profile picture information is on the left side of the connection line between the two eyes in the profile picture information.

With reference to the second embodiment or the first possible implementation manner of the second embodiment, in a second possible implementation manner of the second embodiment, wherein the processor is configured to calculate the included angle between the positive direction of each connection line and the positive direction of the reference line comprises the processor is configured to determine abscissae and ordinates that are respectively corresponding to positions of the two eyes in each piece of profile picture information, and perform an inverse tangent on an absolute value of a difference between the two abscissae and an absolute value of a difference between the two ordinates to obtain the included angle, wherein a direction of a horizontal coordinate axis in which the abscissae are located refers to a direction perpendicular to the positive direction of the reference line, and a direction of a vertical coordinate axis in which the ordinates are located is the positive direction of the reference line.

With reference to the first possible implementation manner of the second embodiment or the second possible implementation manner of the second embodiment, in a third possible implementation manner of the second embodiment, wherein the processor is configured to determine the display mode of the screen according to the first included angle includes the processor is configured to, when the positive direction determining rule is determining the positive direction of the connection line based on that the position of the nose or the mouth in the profile picture information is on the right side of the connection line between two eyes in the profile picture information, determine that the display mode of the screen is a portrait upright display mode if the first included angle ranges from a first degree threshold to a second degree threshold; determine that the display mode of the screen is a landscape right display mode if the first included angle ranges from the second degree threshold to a third degree threshold; determine that the display mode of the screen is a portrait upside-down display mode if the first included angle ranges from the third degree threshold to a fourth degree threshold; and determine that the display mode of the screen is a landscape left display mode if the first included angle ranges from the fourth degree threshold to the first degree threshold.

With reference to the second embodiment, the first possible implementation manner of the second embodiment, the second possible implementation manner of the second embodiment, or the third possible implementation manner of the second embodiment, in a fourth possible implementation manner of the second embodiment, wherein the processor is further configured to use a 2D display manner or a 3D display manner if the display mode of the screen is the portrait upright display mode or the portrait upside-down display mode; or use a 2D display manner if the display mode of the screen is the landscape right display mode or the landscape left display mode.

According to a third embodiment, a terminal device is provided. The terminal device includes a memory configured to store a program; a processor configured to execute the program, so as to determine a connection line between two eyes in each piece of profile picture information by identifying profile picture information of each viewer of two viewers, and determine a positive direction of each connection line according to the connection line between the two eyes in each piece of profile picture information and a preset positive direction determining rule; and a display configured to display mutually independent images to the two viewers when the positive directions of the two connection lines are opposite.

With reference to the third embodiment, in a first possible implementation manner of the third embodiment, wherein the display is configured to display the mutually independent images to the two viewers in a 3D display manner or a 2D display manner.

With reference to the first possible implementation manner of the third embodiment, in a second possible implementation manner of the third embodiment, the terminal device further includes a communications interface configured to receive a first operation instruction sent by a viewer who is operating on the screen and is of the two viewers; and the processor is further configured to perform, according to the first operation instruction, processing on an image that is of the two mutually independent images and that is to be operated by the viewer who is operating on the screen.

With reference to the first possible implementation manner of the third embodiment, in a third possible implementation manner of the third embodiment, wherein the processor is further configured to, before performing processing on the image that is of the two mutually independent images and that is to be operated by the viewer who is operating on the screen, determine, from the two mutually independent images according to an operation direction of the viewer who is operating on the screen and is of the two viewers, the image to be operated by the viewer who is operating on the screen.

With reference to the third possible implementation manner of the third embodiment, in a fourth possible implementation manner of the third embodiment, wherein the communications interface is further configured to receive a switch instruction sent, by using a switch button, by the viewer who is operating on the screen; and the processor is further configured to determine, from the two mutually independent images according to the switch instruction, the image to be operated by the viewer who is operating on the screen.

With reference to the third possible implementation manner of the third embodiment, in a fifth possible implementation manner of the third embodiment, wherein the processor is further configured to, before determining, from the two mutually independent images according to the operation direction of the viewer who is operating on the screen and is of the two viewers, the image to be operated by the viewer who is operating on the screen, acquire, by using a camera, the operation direction of the viewer who is operating on the screen and is of the two viewers, or acquire, by means of sensing, the operation direction of the viewer who is operating on the screen and is of the two viewers, wherein the screen is a touchscreen that supports a floating touch function.

With reference to the first possible implementation manner of the third embodiment, in a sixth possible implementation manner of the third embodiment, wherein that the display is configured to display the mutually independent images to the two viewers in a 3D display manner comprises the display is configured to display two independent windows on the screen, and display the two mutually independent images respectively in the two independent windows in the 3D display manner The communications interface is further configured to receive second operation instructions that are respectively sent by the two viewers and that are for operating corresponding images of the two mutually independent images, wherein the second operation instructions are sent by the viewers by using corresponding windows on the screen; and the processor is further configured to perform operations on the corresponding images according to the second operation instructions.

According to a fourth embodiment, a terminal device is provided. The terminal device includes a memory configured to store a program; and a processor configured to execute the program, so as to identify profile picture information of a viewer, determine a connection line between two eyes in the profile picture information, and determine a positive direction of the connection line according to the connection line between the two eyes and a preset positive direction determining rule; calculate an included angle between the positive direction of the connection line and a positive direction of a reference line, wherein the reference line is determined according to a long side of the screen or a short side of the screen; and determine a display mode of the screen according to the included angle.

With reference to the fourth embodiment, in a first possible implementation manner of the fourth embodiment, wherein the positive direction determining rule comprises determining the positive direction of the connection line based on that a position of a nose or a mouth in the profile picture information is on the right side of the connection line between the two eyes in the profile picture information; or determining the positive direction of the connection line based on that a position of a nose or a mouth in the profile picture information is on the left side of the connection line between the two eyes in the profile picture information.

With reference to the fourth embodiment or the first possible implementation manner of the fourth embodiment, in a second possible implementation manner of the fourth embodiment, wherein the processor is configured to calculate the included angle between the positive direction of each connection line and the positive direction of the reference line comprises the processor is configured to determine abscissae and ordinates that are respectively corresponding to positions of the two eyes in profile picture information, and perform an inverse tangent on an absolute value of a difference between the two abscissae and an absolute value of a difference between the two ordinates to obtain the included angle, wherein a direction of a horizontal coordinate axis in which the abscissae are located refers to a direction perpendicular to the positive direction of the reference line, and a direction of a vertical coordinate axis in which the ordinates are located is the positive direction of the reference line.

With reference to the first possible implementation manner of the fourth embodiment or the second possible implementation manner of the fourth embodiment, in a third possible implementation manner of the fourth embodiment, wherein the processor is configured to determine the display mode of the screen according to the included angle includes the processor is configured to, when the positive direction determining rule is determining the positive direction of the connection line based on that the position of the nose or the mouth in the profile picture information is on the right side of the connection line between two eyes in the profile picture information, determine that the display mode of the screen is a portrait upright display mode if the first included angle ranges from a first degree threshold to a second degree threshold; determine that the display mode of the screen is a landscape right display mode if the first included angle ranges from the second degree threshold to a third degree threshold; determine that the display mode of the screen is a portrait upside-down display mode if the first included angle ranges from the third degree threshold to a fourth degree threshold; and determine that the display mode of the screen is a landscape left display mode if the first included angle ranges from the fourth degree threshold to the first degree threshold.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a RAM, a magnetic disk, or an optical disc.

Finally, it should be noted that the foregoing embodiments are only intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for determining a display mode of a screen, comprising:
    identifying profile picture information of a viewer;
    determining a connection line between two eyes in the profile picture information;
    determining a positive direction of the connection line according to the connection line between the two eyes and a preset positive direction determining rule;
    calculating an included angle between the positive direction of the connection line and a positive direction of a reference line by:
        determining abscissae and ordinates that are respectively corresponding to positions of the two eyes in the profile picture information, wherein a direction of a horizontal coordinate axis in which the abscissae are located refers to a direction perpendicular to the positive direction of the reference line, and wherein a direction of a vertical coordinate axis in which the ordinates are located is the positive direction of the reference line; and
        performing an inverse tangent on an absolute value of a difference between the two abscissae and an absolute value of a difference between the two ordinates to obtain the included angle, wherein the reference line is determined according to a long side of the screen or a short side of the screen; and
    determining the display mode of the screen according to the included angle.

2. The method according to claim 1, wherein the positive direction determining rule comprises one of:
    determining the positive direction of the connection line based on the determination that a position of a nose or a mouth in the profile picture information is on a right side of the connection line between the two eyes in the profile picture information; and
    determining the positive direction of the connection line based on the determination that a position of a nose or a mouth in the profile picture information is on a left side of the connection line between the two eyes in the profile picture information.

3. The method according to claim 1, wherein when the positive direction determining rule is determining the positive direction of the connection line based on that the position of a nose or a mouth in the profile picture information is on a right side of the connection line between the two eyes in the profile picture information, determining the display mode of the screen according to the included angle comprises:
    determining that the display mode of the screen is a portrait upright display mode when the included angle ranges from a first degree threshold to a second degree threshold;
    determining that the display mode of the screen is a landscape right display mode when the included angle ranges from the second degree threshold to a third degree threshold;
    determining that the display mode of the screen is a portrait upside-down display mode when the included angle ranges from the third degree threshold to a fourth degree threshold; and
    determining that the display mode of the screen is a landscape left display mode when the included angle ranges from the fourth degree threshold to the first degree threshold.

4. A method for determining a display mode of a screen, comprising:
    determining a connection line between two eyes in each piece of profile picture information by identifying profile picture information of each viewer of at least two viewers;
    determining a positive direction of each connection line according to the connection line between the two eyes in each piece of profile picture information and a preset positive direction determining rule;
    calculating, when the positive directions of all the connection lines between the two eyes are the same, an included angle between the positive direction of each connection line and a positive direction of a reference line;
    performing averaging on all the included angles to obtain a first included angle, wherein the reference line is determined according to a long side of the screen or a short side of the screen; and
    determining a display mode of the screen according to the first included angle.

5. The method for determining the display mode of the screen according to claim 4, wherein the positive direction determining rule comprises at least one of:
    determining the positive direction of the connection line based on the determination that a position of a nose or a mouth in the profile picture information is on a right side of the connection line between the two eyes in the profile picture information; or
    determining the positive direction of the connection line based on the determination that a position of a nose or a mouth in the profile picture information is on a left side of the connection line between the two eyes in the profile picture information.

6. The method for determining the display mode of the screen according to claim 5, wherein when the positive direction determining rule is determining the positive direction of the connection line based on that the position of the nose or the mouth in the profile picture information is on the right side of the connection line between the two eyes in the profile picture information, determining the display mode of the screen according to the first included angle comprises:
    determining that the display mode of the screen is a portrait upright display mode when the first included angle ranges from a first degree threshold to a second degree threshold;
    determining that the display mode of the screen is a landscape right display mode when the first included angle ranges from the second degree threshold to a third degree threshold;
    determining that the display mode of the screen is a portrait upside-down display mode when the first included angle ranges from the third degree threshold to a fourth degree threshold; and determining that the display mode of the screen is a landscape left display mode when the first included angle ranges from the fourth degree threshold to the first degree threshold.

7. The method for determining the display mode of the screen according to claim 4, wherein calculating the included angle between the positive direction of each connection line and the positive direction of the reference line comprises:
 determining abscissae and ordinates that are respectively corresponding to positions of the two eyes in each piece of profile picture information, wherein a direction of a horizontal coordinate axis in which the abscissae are located refers to a direction perpendicular to the positive direction of the reference line, and wherein a direction of a vertical coordinate axis in which the ordinates are located is the positive direction of the reference line; and
 performing an inverse tangent on an absolute value of a difference between the two abscissae and an absolute value of a difference between the two ordinates to obtain the included angle.

8. The method for determining the display mode of the screen according to claim 4, further comprising one of:
 using a two-dimensional (2D) display manner or a three-dimensional (3D) display manner when the display mode of the screen is a portrait upright display mode or a portrait upside-down display mode; and
 using a 2D display manner when the display mode of the screen is a landscape right display mode or a landscape left display mode.

9. A terminal device, comprising:
 a memory configured to store a program; and
 a processor configured to execute the program and cause the terminal device to:
  identify profile picture information of a viewer;
  determine a connection line between two eyes in the profile picture information;
  determine a positive direction of the connection line according to the connection line between the two eyes and a preset positive direction determining rule;
  calculate an included angle between the positive direction of the connection line and a positive direction of a reference line by:
   determining abscissae and ordinates that are respectively corresponding to positions of the two eyes in profile picture information; and
   performing an inverse tangent on an absolute value of a difference between the two abscissae and an absolute value of a difference between the two ordinates to obtain the included angle,
  wherein a direction of a horizontal coordinate axis in which the abscissae are located refers to a direction perpendicular to the positive direction of the reference line, and a direction of a vertical coordinate axis in which the ordinates are located is the positive direction of the reference line, and wherein the reference line is deter mined according to a long side of a screen of the terminal device or a short side of the screen; and
  determine a display mode of the screen according to the included angle.

10. The terminal device according to claim 9, wherein the positive direction determining rule comprises one of:
 determining the positive direction of the connection line based on the determination that a position of a nose or a mouth in the profile picture information is on a right side of the connection line between the two eyes in the profile picture information; and
 determining the positive direction of the connection line based on the determination that a position of a nose or a mouth in the profile picture information is on a left side of the connection line between the two eyes in the profile picture information.

11. The terminal device according to claim 9, wherein, when the positive direction determining rule is determining the positive direction of the connection line based on that the position of a nose or a mouth in the profile picture information is on a right side of the connection line between two eyes in the profile picture information, the processor is configured to determine the display mode of the screen according to the included angle comprises:
 determining that the display mode of the screen is a portrait upright display mode if the first included angle ranges from a first degree threshold to a second degree threshold;
 determining that the display mode of the screen is a landscape right display mode if the first included angle ranges from the second degree threshold to a third degree threshold;
 determining that the display mode of the screen is a portrait upside-down display mode if the first included angle ranges from the third degree threshold to a fourth degree threshold; and
 determining that the display mode of the screen is a landscape left display mode if the first included angle ranges from the fourth degree threshold to the first degree threshold.

\* \* \* \* \*